US011906908B2

(12) United States Patent
Fujii

(10) Patent No.: US 11,906,908 B2
(45) **Date of Patent: *Feb. 20, 2024**

(54) DEVELOPING CARTRIDGE HAVING ELECTRODE

(71) Applicant: BROTHER KOGYO KABUSHIKI KAISHA, Nagoya (JP)

(72) Inventor: Yasumasa Fujii, Chiryu (JP)

(73) Assignee: BROTHER KOGYO KABUSHIKI KAISHA, Aichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/155,789

(22) Filed: Jan. 18, 2023

(65) Prior Publication Data

US 2023/0152728 A1 May 18, 2023

Related U.S. Application Data

(63) Continuation of application No. 17/405,225, filed on Aug. 18, 2021, now Pat. No. 11,567,423, which is a (Continued)

(30) Foreign Application Priority Data

Jul. 9, 2012 (JP) ................................ 2012-154132

(51) Int. Cl.
*G03G 15/06* (2006.01)
*G03G 5/08* (2006.01)
(Continued)

(52) U.S. Cl.
CPC ....... *G03G 15/065* (2013.01); *G03G 15/0806* (2013.01); *G03G 15/0808* (2013.01);
(Continued)

(58) Field of Classification Search
None
See application file for complete search history.

(56) References Cited

U.S. PATENT DOCUMENTS 5,648,838 A 7/1997 Michlin et al.
6,122,470 A 9/2000 Kimura
(Continued)

FOREIGN PATENT DOCUMENTS

CN 1892485 A 1/2007
CN 101082799 A 12/2007
(Continued)

OTHER PUBLICATIONS

Jan. 22, 2013—International Search Report—Intl App PCT/JP2012/080827.

(Continued)

*Primary Examiner* — Roy Y Yi
(74) *Attorney, Agent, or Firm* — Merchant & Gould P.C.

(57) ABSTRACT

A developing cartridge includes a casing, a developer-carrying member, a supply member, a developing electrode, a supply electrode, and an insulating member. The casing is configured to accommodate therein developer. The developer-carrying member is configured to rotate about a rotational axis and carry the developer thereon. The supply member is configured to supply the developer to the developer-carrying member. The developing electrode is configured to be electrically connected to the developer-carrying member. The supply electrode is configured to be electrically connected to the supply member. The insulating member insulates the developing electrode and the supply electrode with each other. The developing electrode, the insulating member, and the supply electrode are overlapped in this order in an axial direction of the rotational axis.

13 Claims, 11 Drawing Sheets

Related U.S. Application Data continuation of application No. 17/193,426, filed on Mar. 5, 2021, now Pat. No. 11,231,660, which is a continuation of application No. 17/038,310, filed on Sep. 30, 2020, now Pat. No. 11,307,511, which is a continuation of application No. 16/867,129, filed on May 5, 2020, now Pat. No. 10,824,090, which is a continuation of application No. 16/578,756, filed on Sep. 23, 2019, now Pat. No. 10,649,363, which is a continuation of application No. 16/290,326, filed on Mar. 1, 2019, now Pat. No. 10,459,366, which is a continuation of application No. 16/180,408, filed on Nov. 5, 2018, now Pat. No. 10,429,763, which is a continuation of application No. 15/370,515, filed on Dec. 6, 2016, now Pat. No. 10,151,998, which is a continuation of application No. 15/075,434, filed on Mar. 21, 2016, now Pat. No. 9,547,253, which is a continuation of application No. 14/593,123, filed on Jan. 9, 2015, now Pat. No. 9,423,765, which is a continuation-in-part of application No. PCT/JP2012/080824, filed on Nov. 29, 2012.

(51) Int. Cl.
*G03G 21/16* (2006.01)
*G03G 15/08* (2006.01)

(52) U.S. Cl.
CPC ..... *G03G 15/0855* (2013.01); *G03G 15/0865* (2013.01); *G03G 21/1652* (2013.01); *G03G 21/1676* (2013.01); *G03G 2221/166* (2013.01)

(56) References Cited

U.S. PATENT DOCUMENTS

| | | | | |
|---|---|---|---|---|
| 6,385,414 | B1 | 5/2002 | Sato et al. | |
| 7,085,516 | B2 | 8/2006 | Kawai et al. | |
| 7,136,603 | B2 | 11/2006 | Kawai | |
| 7,536,130 | B2 | 5/2009 | Yokoi | |
| 8,050,593 | B2 | 11/2011 | Furuichi et al. | |
| 8,494,419 | B2 | 7/2013 | Shiraki et al. | |
| 8,538,291 | B2 | 9/2013 | Mori | |
| 8,577,244 | B2 | 11/2013 | Takagi et al. | |
| 8,682,200 | B2 | 3/2014 | Chadani et al. | |
| 8,682,216 | B2 | 3/2014 | Handa et al. | |
| 9,037,032 | B2 | 5/2015 | Takagi et al. | |
| 9,195,208 | B2 | 11/2015 | Takagi et al. | |
| 9,201,389 | B2 | 12/2015 | Takagi et al. | |
| 9,207,631 | B2 | 12/2015 | Takagi et al. | |
| 9,213,305 | B2 | 12/2015 | Takagi et al. | |
| 9,261,857 | B2 | 2/2016 | Fujii et al. | |
| 9,268,295 | B2 | 2/2016 | Takagi et al. | |
| 9,395,681 | B2 | 7/2016 | Fujii et al. | |
| 9,568,856 | B2 | 2/2017 | Takagi et al. | |
| 9,632,456 | B2 | 4/2017 | Takagi et al. | |
| 9,733,589 | B2 | 8/2017 | Fujii et al. | |
| 9,851,689 | B2 | 12/2017 | Takagi et al. | |
| 10,133,207 | B2 | 11/2018 | Fujii et al. | |
| 10,151,998 | B2 | 12/2018 | Fujii | |
| 10,444,659 | B2 | 10/2019 | Fujii et al. | |
| 10,649,363 | B2 | 5/2020 | Fujii | |
| 10,775,713 | B2 | 9/2020 | Fuji et al. | |
| 11,150,573 | B2 | 10/2021 | Fujii et al. | |
| 11,480,889 | B2 | 10/2022 | Fujii et al. | |
| 11,567,423 | B2 * | 1/2023 | Fujii .................. | G03G 15/0855 |
| 2003/0156848 | A1 | 8/2003 | Kawai et al. | |
| 2005/0047814 | A1 | 3/2005 | Kawai | |
| 2005/0047825 | A1 | 3/2005 | Nakano et al. | |
| 2006/0029418 | A1 | 2/2006 | Ishii et al. | |
| 2006/0029419 | A1 | 2/2006 | Shiraki | |
| 2006/0029420 | A1 | 2/2006 | Ishii et al. | |
| 2006/0029421 | A1 | 2/2006 | Ishii et al. | |
| 2006/0029422 | A1 | 2/2006 | Shiraki | |
| 2006/0029423 | A1 | 2/2006 | Shiraki | |
| 2007/0009281 | A1 | 1/2007 | Sato et al. | |
| 2007/0059018 | A1 | 3/2007 | Tokuda | |
| 2007/0140725 | A1 | 6/2007 | Kamimura | |
| 2007/0280745 | A1 | 12/2007 | Takashima et al. | |
| 2008/0138118 | A1 | 6/2008 | Imamura et al. | |
| 2008/0292356 | A1 | 11/2008 | Furuichi et al. | |
| 2008/0298838 | A1 | 12/2008 | Sato et al. | |
| 2011/0158685 | A1 | 6/2011 | Takagi et al. | |
| 2011/0182627 | A1 | 7/2011 | Shiraki et al. | |
| 2011/0236063 | A1 | 9/2011 | Handa et al. | |
| 2011/0280620 | A1 | 11/2011 | Chadani et al. | |
| 2013/0114972 | A1 | 5/2013 | Takarada et al. | |
| 2013/0287425 | A1 | 10/2013 | Takagi | |
| 2014/0037319 | A1 | 2/2014 | Takagi et al. | |
| 2014/0050503 | A1 | 2/2014 | Chadani et al. | |
| 2014/0294450 | A1 | 10/2014 | Handa et al. | |
| 2015/0055986 | A1 | 2/2015 | Takagi et al. | |
| 2015/0125175 | A1 | 5/2015 | Fujii | |
| 2015/0160603 | A1 | 6/2015 | Takagi et al. | |
| 2015/0160604 | A1 | 6/2015 | Takagi et al. | |
| 2015/0160605 | A1 | 6/2015 | Takagi et al. | |
| 2015/0160606 | A1 | 6/2015 | Takagi et al. | |
| 2016/0124341 | A1 | 5/2016 | Takagi et al. | |
| 2016/0179032 | A1 | 6/2016 | Takagi et al. | |
| 2017/0146949 | A1 | 5/2017 | Takagi et al. | |
| 2018/0107152 | A1 | 4/2018 | Takagi et al. | |

FOREIGN PATENT DOCUMENTS

| | | | |
|---|---|---|---|
| CN | 100462869 | C | 2/2009 |
| CN | 102109792 | A | 6/2011 |
| CN | 102141753 | A | 8/2011 |
| CN | 104428721 | A | 3/2015 |
| CN | 110161819 | A | 8/2019 |
| CN | 110262202 | A | 9/2019 |
| EP | 2343606 | A1 | 7/2011 |
| JP | 2000-003092 | A | 1/2000 |
| JP | 2001-100493 | A | 4/2001 |
| JP | 2003-223091 | A | 8/2003 |
| JP | 2005-070402 | A | 3/2005 |
| JP | 2005-070407 | A | 3/2005 |
| JP | 2005-215548 | A | 8/2005 |
| JP | 2006-072285 | A | 3/2006 |
| JP | 2008-292769 | A | 12/2008 |
| JP | 2011-133767 | A | 7/2011 |
| JP | 2011-154239 | A | 8/2011 |
| JP | 2011-203367 | A | 10/2011 |
| JP | 2011-257741 | A | 12/2011 |
| JP | H08-6340 | A | 5/2014 |
| WO | 2012/090907 | A1 | 7/2012 |

OTHER PUBLICATIONS

Jan. 22, 2013—International Search Report—Intl App PCT/JP2012/080824.

Jan. 22, 2015—International Preliminary Report on Patentability—Intl App PCT/JP2012/080827.

Jan. 22, 2015—International Preliminary Report on Patentability—Intl App PCT/JP2012/080824.

Jul. 23, 2015—(US) Ex Parte Quayle Action—U.S. Appl. No. 14/593,161.

Oct. 5, 2015—(US) Notice of Allowance—U.S. Appl. No. 14/593,161.

Dec. 1, 2015—(JP) Office Action—App 2012-154135.

Dec. 1, 2015—(JP) Office Action—App 2012-154132.

Feb. 2, 2016—(EP) Extended Search Report—App 12880909.2.

Mar. 21, 2016—(US) Notice of Allowance—U.S. Appl. No. 14/988,263.

May 19, 2016—(EP) Extended Search Report—App 12880728.6.

Feb. 3, 2017—(US) Non-Final Office Action—U.S. Appl. No. 15/196,571.

Apr. 19, 2017—(US) Notice of Allowance—U.S. Appl. No. 15/196,571.

Feb. 27, 2018—(US) Notice of Allowance—U.S. Appl. No. 15/662,659.

Apr. 4, 2018—(CN) Notification of First Office Action—App 201280074600.1.

Apr. 3, 2018—(CN) Notification of First Office Action—App 201280074634.0.

(56) References Cited

OTHER PUBLICATIONS

Jul. 24, 2018—(US) Notice of Allowance—U.S. Appl. No. 15/662,659.
Feb. 14, 2019—(EP) Extended Search Report—App 18199929.3.
Apr. 15, 2019—(US) Notice of Allowance Office Action—U.S. Appl. No. 16/165,195.
Jun. 6, 2019—(US) Notice of Allowance—U.S. Appl. No. 16/165,195.
Feb. 11, 2020—(US) Non-final Office Action—U.S. Appl. No. 16/574,525.
Apr. 8, 2020—(US) Notice of Allowance—U.S. Appl. No. 16/574,525.
Jun. 18, 2020—(US) Non-final Office Action—U.S. Appl. No. 16/867,079.
Jul. 21, 2020—(EP) Extended Search Report—App 20160718.1.
Sep. 1, 2020—(US) Notice of Allowance—U.S. Appl. No. 16/867,079.
Office Action issued in related U.S. Appl. No. 16/935,393, dated Feb. 2, 2021.
Office Action issued in corresponding German Patent Application No. 11 2012 006 676.6, dated Apr. 7, 2021.
Office Action issued in corresponding Chinese Patent Application No. 201910278221.8, dated Apr. 14, 2021.
Office Action issued in corresponding Chinese Patent Application No. 201910275498.5, dated Apr. 27, 2021.
Office Action issued in corresponding Chinese Patent Application No. 201910275919.4, dated May 6, 2021.
Notice of Allowance issued in related U.S. Appl. No. 16/935,393, dated May 21, 2021.
Notice of Allowance issued in related U.S. Appl. No. 16/935,393, dated Jun. 24, 2021.
Decision of Rejection issued in corresponding Chinese Patent Application No. 201910278221.8, dated Jul. 6, 2021.
Decision of Rejection issued in corresponding Chinese Patent Application No. 201910275498.5, dated Feb. 11, 2022.
Decision of Rejection issued in corresponding Chinese Patent Application No. 201910275919.4, dated Feb. 14, 2022.
Non-final Office Action issued in related U.S. Appl. No. 17/474,245, dated May 24, 2022.
Office Action issued in related U.S. Appl. No. 18/046,580, dated Sep. 8, 2023.
Reexamination Notice issued in corresponding Chinese application 2019102782218, dated Aug. 1, 2023.

* cited by examiner

DEVELOPING CARTRIDGE HAVING ELECTRODE

REFERENCE TO RELATED APPLICATIONS

This application is a continuation of U.S. patent application Ser. No. 17/405,225, filed Aug. 18, 2021, issued as U.S. Pat. No. 11,567,423 on Jan. 31, 2023, which is a continuation of U.S. patent application Ser. No. 17/193,426, filed Mar. 5, 2021, issued as U.S. Pat. No. 11,231,660 on Jan. 25, 2022, which is a continuation of U.S. patent application Ser. No. 17/038,310 filed Sep. 30, 2020, issued as U.S. Pat. No. 11,307,511 on Apr. 19, 2022, which is a continuation of U.S. patent application Ser. No. 16/867,129 filed May 5, 2020, issued as U.S. Pat. No. 10,824,090 on Nov. 3, 2020, which is a continuation of U.S. patent application Ser. No. 16/578,756 filed Sep. 23, 2019, issued as U.S. Patent Application No. 10,649,363 on May 12, 2020, which is a continuation of U.S. patent application Ser. No. 16/290,326 filed Mar. 1, 2019, issued as U.S. Pat. No. 10,459,366 on Oct. 29, 2019, which is a continuation of U.S. patent application Ser. No. 16/180,408 filed Nov. 5, 2018, issued as U.S. Pat. No. 10,429,763 on Oct. 1, 2019, which is a continuation of U.S. patent application Ser. No. 15/370,515 filed Dec. 6, 2016, issued as U.S. Patent Application No. 10,151,998 on Dec. 11, 2018, which is a continuation of U.S. patent application Ser. No. 15/075,434 filed Mar. 21, 2016, issued as U.S. Pat. No. 9,547,253 on Jan. 17, 2017, which is a continuation of U.S. patent application Ser. No. 14/593,123 filed Jan. 9, 2015, issued as U.S. Pat. No. 9,423,765 on Aug. 23, 2016, which is a Continuation-in-Part of International Application No. PCT/JP2012/080824 filed Nov. 29, 2012 in Japan Patent Office as a Receiving Office, which claims priority from Japanese Patent Application 2012-154132 filed Jul. 9, 2012. The contents of these applications are incorporated herein by reference.

BACKGROUND ART

Technical Field

The present invention relates to a developing cartridge adapted to be mounted on an image forming device that employs an electrophotographic system.

Background

As described in Japanese unexamined patent application publication No. 2005-70402, an image-forming device known in the art that employs an electrophotographic system has a developing cartridge that is detachably mounted in a device body for supplying developer to a photosensitive drum.

One such developing cartridge that has been proposed is a developing unit comprising a developing roller that carries toner, a supply roller that supplies toner to the developing roller, a first contact member that electrically connects to a rotational shaft of the developing roller, and a second contact member that electrically connects to a rotational shaft of the supply roller.

SUMMARY

In this developing unit, the first contact member and the second contact member are retained in a cover member that covers ends of rotational shafts in the developing roller and the supply roller, such that contact parts on the first and the second contact members protrude from an outer surface of the cover member.

However, to make the developing unit described in the Patent Document described above more compact, the first and the second contact members must be placed in close proximity to each other.

When the first and the second contact members are placed in close proximity to each other, it becomes more difficult to ensure that the first and the second contact members are insulated from each other.

In view of the foregoing, it is an object of the present invention to provide a developing cartridge that can be made compact while reliably insulating a developing electrode and a supply electrode from each other.

In order to attain the above and other objects, the present invention provides a developing cartridge. The developing cartridge may include a casing, a developer-carrying member, a supply member, a developing electrode, a supply electrode, and an insulating member. The casing may be configured to accommodate therein developer. The developer-carrying member may be configured to rotate about a rotational axis extending in an axial direction and carry the developer thereon. The supply member may be configured to supply the developer to the developer-carrying member. The developing electrode may be configured to be electrically connected to the developer-carrying member. The supply electrode may be configured to be electrically connected to the supply member. The insulating member may insulate the developing electrode and the supply electrode with each other. The developing electrode, the insulating member, and the supply electrode may be overlapped in this order in the axial direction.

According to another aspect of the present invention, the present invention provides a developing cartridge. The developing cartridge may include a casing, a developer-carrying member, a supply member, a developing electrode, a supply electrode, and an insulating member. The casing may be configured to accommodate therein developer. The developer-carrying member may be configured to rotate about a rotational axis extending in an axial direction and carry the developer thereon. The supply member may be configured to supply the developer to the developer-carrying member. The developing electrode may be configured to be electrically connected to the developer-carrying member. The supply electrode may be configured to be electrically connected to the supply member and arranged to confront the developing electrode in the axial direction with a gap therebetween. The insulating member may insulate the developing electrode and the supply electrode with each other and be arranged between the developing electrode and the supply electrode.

DETAILED DESCRIPTION

1. Printer

Figure 1:
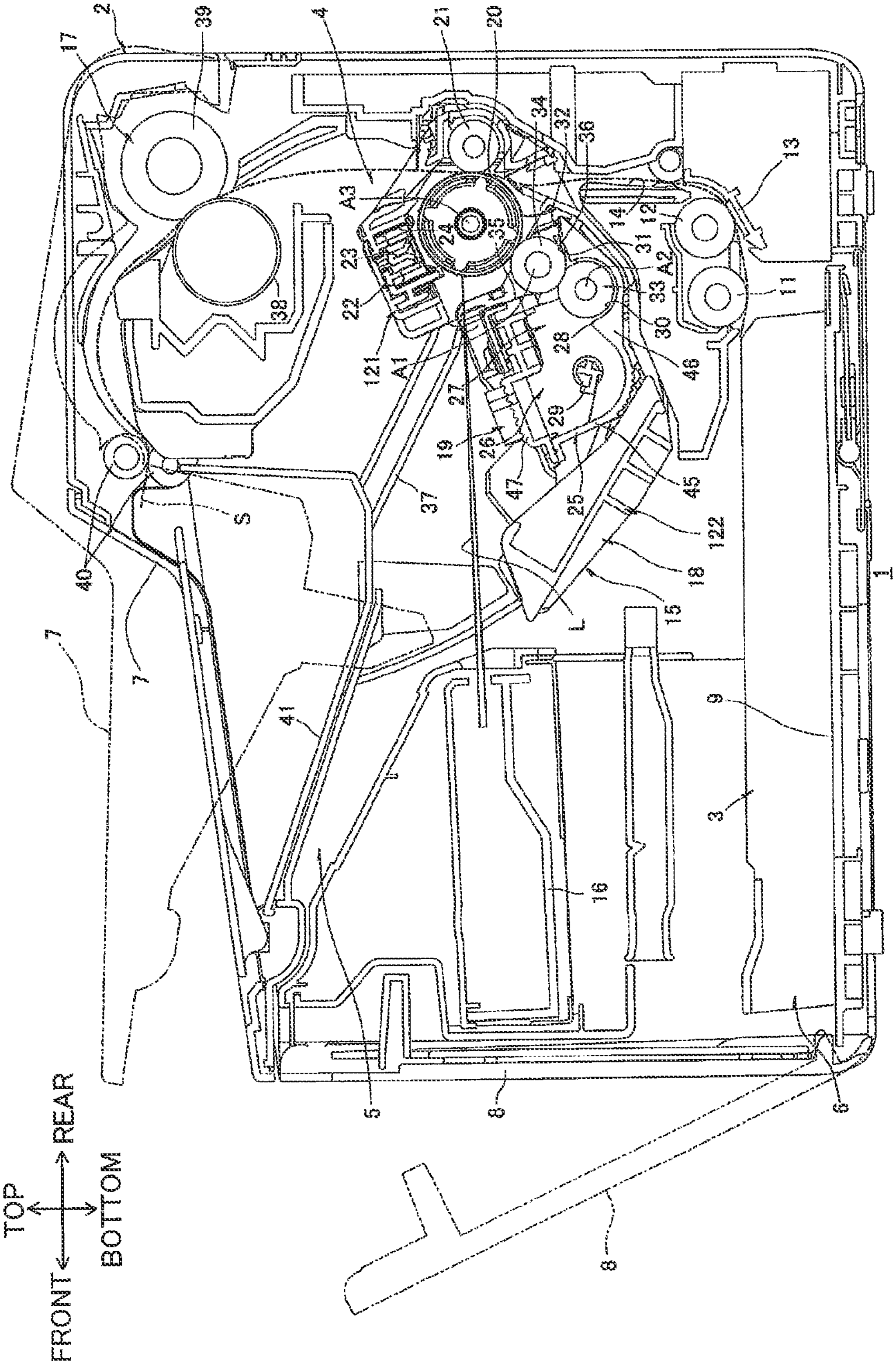
FIG. 1 is a central cross-sectional view of a printer in which a developing cartridge is mounted according to an embodiment of the present invention.

As shown in FIG. 1, the printer 1 is provided with a main casing 2 having a box-like shape.

Within the main casing 2, the printer 1 is also provided with a sheet-feeding unit 3 for feeding sheets S of paper, and an image-forming unit 4 for forming images on the sheets S supplied by the sheet-feeding unit 3.

Directions related to the printer 1 will be specified based on the orientation of the printer 1 when resting on a level surface, and specifically will refer to the directions indicated by arrows in FIG. 1.

(1) Main Casing

The main casing 2 is formed with a cartridge access opening 5 for mounting and removing a process cartridge 15 (described later), and a paper-introducing opening 6 through which the sheets S are inserted into the main casing 2.

The cartridge access opening 5 is formed in the top portion of the main casing 2 and penetrates the main casing 2 in the top-bottom direction.

The paper-introducing opening 6 is formed in the front side of the main casing 2 at the bottom portion thereof and penetrates the front side in the front-rear direction.

The main casing 2 also includes a top cover 7 disposed on the top portion thereof, and a sheet-feeding cover 8 disposed on the front thereof. The top cover 7 is provided with a discharge tray 41 into which sheets S are discharged.

The top cover 7 is disposed so as to be capable of pivoting (moving) about its rear edge between a closed position for covering the cartridge access opening 5, and an open position for exposing the cartridge access opening 5.

The sheet-feeding cover 8 is disposed so as to be capable of pivoting (moving) about its bottom edge between a first position for covering the paper-introducing opening 6, and a second position for exposing the paper-introducing opening 6.

(2) Sheet-Feeding Unit

The sheet-feeding unit 3 includes a sheet-supporting part 9 provided in the bottom portion of the main casing 2.

The sheet-supporting part 9 is in communication with the exterior of the main casing 2 through the paper-introducing opening 6.

When the sheet-feeding cover 8 is in the second position, sheets S of paper are inserted into the sheet-feeding unit 3 through the paper-introducing opening 6 such that the rear portions of the sheets S are stacked on the sheet-supporting part 9 and the front portions of the sheets S are stacked on the top surface of the sheet-feeding cover 8.

The sheet-feeding unit 3 further includes a pickup roller 11 disposed above the rear edge of the sheet-supporting part 9, a feeding roller 12 disposed on the rear side of the pickup roller 11, a feeding pad 13 arranged so as to confront the lower rear side of the feeding roller 12, and a feeding path 14 extending continuously upward from the rear edge of the feeding pad 13.

(3) Image-Forming Unit

The image-forming unit 4 includes a process cartridge 15, a scanning unit 16, and a fixing unit 17.

(3-1) Process Cartridge

The process cartridge 15 can be mounted in and removed from the main casing 2. When mounted in the main casing 2, the process cartridge 15 is arranged above the rear portion of the sheet-feeding unit 3.

The process cartridge 15 includes a drum cartridge 18, and a developing cartridge 19. The drum cartridge 18 as an example of the external device is detachably mountable in the main casing 2. The developing cartridge 19 is detachably mountable in the drum cartridge 18.

The drum cartridge 18 includes a photosensitive drum 20, a transfer roller 21, and a scorotron charger 22.

The photosensitive drum 20 is formed in a general cylindrical shape that is elongated in the left-right direction (axial direction). The photosensitive drum 20 is rotatably provided at the rear region of the drum cartridge 18.

The transfer roller 21 is formed in a general columnar shape that is elongated in the left-right direction. The transfer roller 21 is in pressure contact with the rear side of the photosensitive drum 20.

More specifically, the transfer roller 21 is disposed on the rear side of the photosensitive drum 20 with its central axis positioned slightly lower than the central axis of the photosensitive drum 20. Note that the bottom surface of the transfer roller 21 is higher than the bottom surface of the photosensitive drum 20. That is, a virtual line segment (not shown) connecting the central axis of the transfer roller 21 to the central axis of the photosensitive drum 20 forms an acute angle of approximately 3° with a virtual line (not shown) extending horizontally in the front-rear direction. Accordingly, the weight of the transfer roller 21 does not affect the pressure with which the transfer roller 21 contacts the photosensitive drum 20 (transfer pressure).

The scorotron charger 22 is arranged to confront the upper front side of the photosensitive drum 20 with a gap therebetween.

The scorotron charger 22 is disposed at a position separated from the transfer roller 21 in the circumferential direction of the photosensitive drum 20. More specifically, the scorotron charger 22 is disposed such that a virtual line segment (not shown) connecting the central axis of the photosensitive drum 20 with the central axis of the transfer roller 21 forms an angle of approximately 120° with a virtual line segment (not shown) connecting the central axis of the photosensitive drum 20 with a charging wire 23 (described later).

The scorotron charger 22 further includes the charging wire 23, and a grid 24.

The charging wire 23 is stretched in a taut state to extend in the left-right direction and is disposed so as to confront but remain separated from the upper front side of the photosensitive drum 20.

The grid 24 is formed to have a general angular U-shape in a side view and is formed with the opening of the "U" facing diagonally upward and forward so as to surround the charging wire 23 from the lower rear side.

The developing cartridge 19 is disposed on the lower front side of the photosensitive drum 20. The developing cartridge 19 includes a developing-cartridge frame 25 as an example of the casing.

The developing-cartridge frame 25 defines therein a toner-accommodating chamber 26 and a development chamber 27. The toner-accommodating chamber 26 and the development chamber 27 are provided side by side in the front-rear direction, with a communication opening 28 allowing communication therebetween. The toner-accommodating chamber 26 and the development chamber 27 have substantially the same capacity.

The toner-accommodating chamber 26 accommodates therein toner (developer). An agitator 29 is provided in the approximate front-rear and vertical center region of the toner-accommodating chamber 26. In other words, the agitator 29 is positioned lower than the photosensitive drum 20.

In the development chamber 27, a bottom wall 46 (described later) has a top surface formed with a supply-roller groove 30, a developing-roller opposing surface 31, and a lower-film adhering surface 32.

The supply-roller groove 30 is formed in a general semicircular shape conforming to the circumferential surface of a supply roller 33 (described later), with the convex shape of the supply-roller groove 30 depressed obliquely downward and rearward.

The developing-roller-opposing surface 31 is formed in a general arc shape that conforms to the circumferential surface of a developing roller 34 (described later). The developing-roller opposing surface 31 extends continuously from the rear edge of the supply-roller groove 30 toward the upper rear side.

The lower-film adhering surface 32 is formed continuously with the rear edge of the developing-roller opposing surface 31 and extends rearward therefrom. Thus, the lower-film adhering surface 32 is arranged higher than the developing-roller opposing surface 31.

The lower-film adhering surface 32 is also arranged so as to confront the bottom portion of the photosensitive drum 20 in the top-bottom direction, with a gap therebetween. The lower-film adhering surface 32 is arranged to overlap the central axis of the photosensitive drum 20 when projected vertically.

The supply roller 33 as an example of the supply member, the developing roller 34 as an example of the developer-carrying member, a thickness-regulating blade 35, and a lower film 36 are provided in the development chamber 27.

The supply roller 33 is formed in a general columnar shape that is elongated in the left-right direction. The supply roller 33 is provided in the front region of the development chamber 27 with its bottom portion disposed in the supply-roller groove 30. The supply roller 33 is capable of rotating about its central axis. With this configuration, the supply roller 33 is disposed on the rear side of the toner-accommodating chamber 26 and is arranged at the same approximate height as the toner-accommodating chamber 26.

The developing roller 34 is formed in a general columnar shape that is elongated in the left-right direction. The developing roller 34 is provided in the rear region of the development chamber 27 such that the bottom circumferential surface of the developing roller 34 opposes the developing-roller opposing surface 31 with a gap therebetween. The developing roller 34 is capable of rotating about its central axis (rotational axis).

The developing roller 34 is also disposed so as to contact the upper rear side of the supply roller 33 and so that the upper rear side surfaces of the developing roller 34 are exposed outside the development chamber 27 and contact the lower front surface of the photosensitive drum 20. In other words, the developing roller 34 is arranged on the upper rear side of the supply roller 33 and the lower front side of the photosensitive drum 20. The central axes of the supply roller 33, the developing roller 34, and the photosensitive drum 20 are positioned along substantially the same line following a radial direction of the photosensitive drum 20.

The developing roller 34 is also disposed in a position separated from the scorotron charger 22 in the circumferential direction of the photosensitive drum 20. More specifically, the developing roller 34 is arranged such that a virtual line segment (not shown) connecting the central axis of the photosensitive drum 20 to the charging wire 23 forms an angle of approximately 120° with a virtual line segment (not shown) connecting the central axis of the photosensitive drum 20 to the central axis of the developing roller 34. Hence, the developing roller 34, the scorotron charger 22, and the transfer roller 21 are arranged at substantially equal intervals along the circumferential direction of the photosensitive drum 20.

The top edge of the thickness-regulating blade 35 is fixed to the rear edge of the top wall defining the development chamber 27. The bottom edge of the thickness-regulating blade 35 contacts the developing roller 34 from the front side thereof.

The rear portion of the lower film 36 is fixed to the lower-film adhering surface 32. The front edge of the lower film 36 contacts the circumferential surface of the developing roller 34 above the developing-roller opposing surface 31.

(3-2) Scanning Unit

The scanning unit 16 is arranged on the front side of the process cartridge 15 in a position opposing but separated from the photosensitive drum 20 in the front-rear direction.

The scanning unit 16 irradiates a laser beam L toward the photosensitive drum 20 based on image data, thereby exposing the circumferential surface of the photosensitive drum 20.

More specifically, the scanning unit 16 irradiates the laser beam L rearward to expose the circumferential surface of the photosensitive drum 20 on the front side thereof. In other words, the exposure point at which the photosensitive drum 20 is exposed (the circumferential surface on the front side of the photosensitive drum 20) is configured to be on the opposite side of the nip part, where the photosensitive drum 20 and transfer roller 21 contact each other, with respect to the central axis of the photosensitive drum 20.

At this time, the developing cartridge 19 is arranged beneath the path of the irradiated laser beam L, while the scorotron charger 22 is disposed above the path of the irradiated laser beam L.

The main casing 2 has inner surfaces provided with guide parts 37 positioned at the space between the scanning unit 16 and the photosensitive drum 20 for guiding mounting and removal of the process cartridge 15. When removing the process cartridge 15 from the main casing 2, the guide parts 37 guide the process cartridge 15 so that the developing cartridge 19 mounted in the drum cartridge 18 moves upward, passing from the bottom side of the irradiation path on the laser beam L to the top side thereof.

At this time, various rollers provided in the process cartridge 15 (the transfer roller 21, the supply roller 33, and the developing roller 34) also pass upward through the irradiation path of the laser beam L.

(3-3) Fixing Unit

The fixing unit 17 is disposed above the rear portion of the drum cartridge 18. More specifically, the fixing unit 17 includes a heating roller 38 disposed above the scorotron charger 22, and a pressure roller 39 that is in pressure contact with the upper rear side of the heating roller 38.

Hence, the heating roller 38 is disposed near the upper edge (open side edge) of the grid 24 in the scorotron charger 22.

(4) Image-Forming Operation

The agitator 29 rotates to supply toner from the toner-accommodating chamber 26 of the developing cartridge 19 to the supply roller 33 through the communication opening 28. The supply roller 33 in turn supplies the toner onto the developing roller 34, at which time the toner is positively tribocharged between the supply roller 33 and the developing roller 34.

The thickness-regulating blade 35 regulates the thickness of toner supplied to the developing roller 34 as the developing roller 34 rotates so that a thin layer of toner having uniform thickness is carried on the surface of the developing roller 34.

In the meantime, the scorotron charger 22 uniformly charges the surface of the photosensitive drum 20. The scanning unit 16 subsequently exposes the surface of the photosensitive drum 20, forming an electrostatic latent image on the circumferential surface of the photosensitive drum 20 based on image data. Next, the toner carried on the developing roller 34 is supplied to the electrostatic latent image on the circumferential surface of the photosensitive drum 20 so that a toner image (developer image) is carried on the circumferential surface of the photosensitive drum 20.

The rotating pickup roller 11 supplies sheets S stacked on the sheet-supporting part 9 between the feeding roller 12 and the feeding pad 13, and the rotating feeding roller 12 separates the sheets S, conveys each separated sheet S onto the feeding path 14, and supplies the sheets S one at a time to the image-forming unit 4 (between the photosensitive drum 20 and the transfer roller 21) at a prescribed timing.

Each sheet S is conveyed upward between the photosensitive drum 20 and the transfer roller 21, at which time the toner image is transferred from the photosensitive drum 20 onto the sheet S, forming an image on the sheet S.

Next, the sheet S passes between the heating roller 38 and the pressure roller 39. At this time, the heating roller 38 and the pressure roller 39 apply heat and pressure to the sheet S to thermally fix the image to the sheet S.

The sheet S is subsequently conveyed toward discharge rollers 40. The discharge rollers 40 discharge the sheet S onto the discharge tray 41 formed on the top surface of the main casing 2.

In this way, the sheet S is supplied from the sheet-supporting part 9 and conveyed along a conveying path that has a general C-shape in a side view, passing first between the photosensitive drum 20 and the transfer roller 21 (the nip part) and next between the heating roller 38 and the pressure roller 39, and subsequently being discharged onto the discharge tray 41.

2. Developing Cartridge

Figure 2:
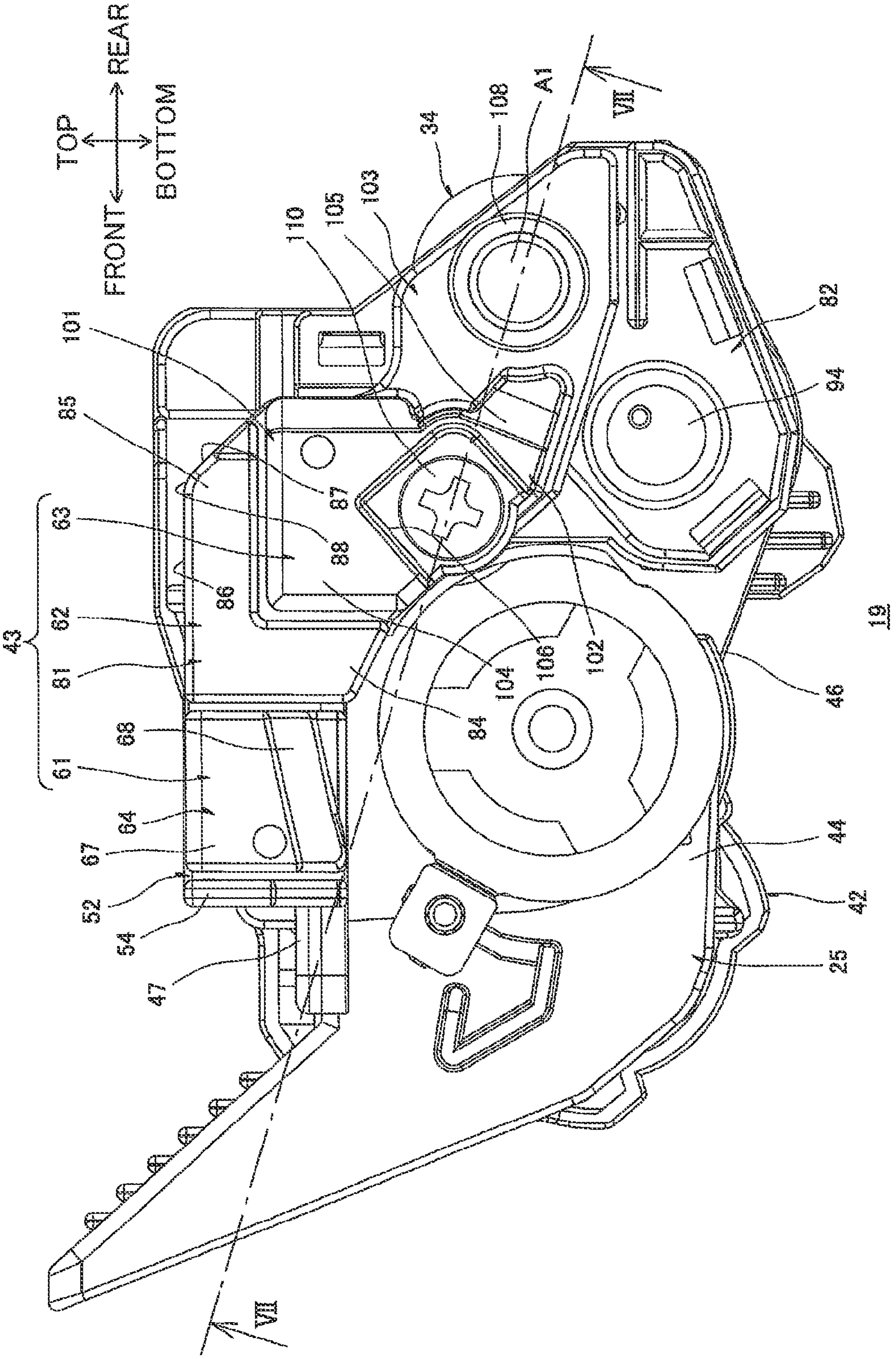
FIG. 2 is a right side view of the developing cartridge shown in FIG. 1.
Figure 3:
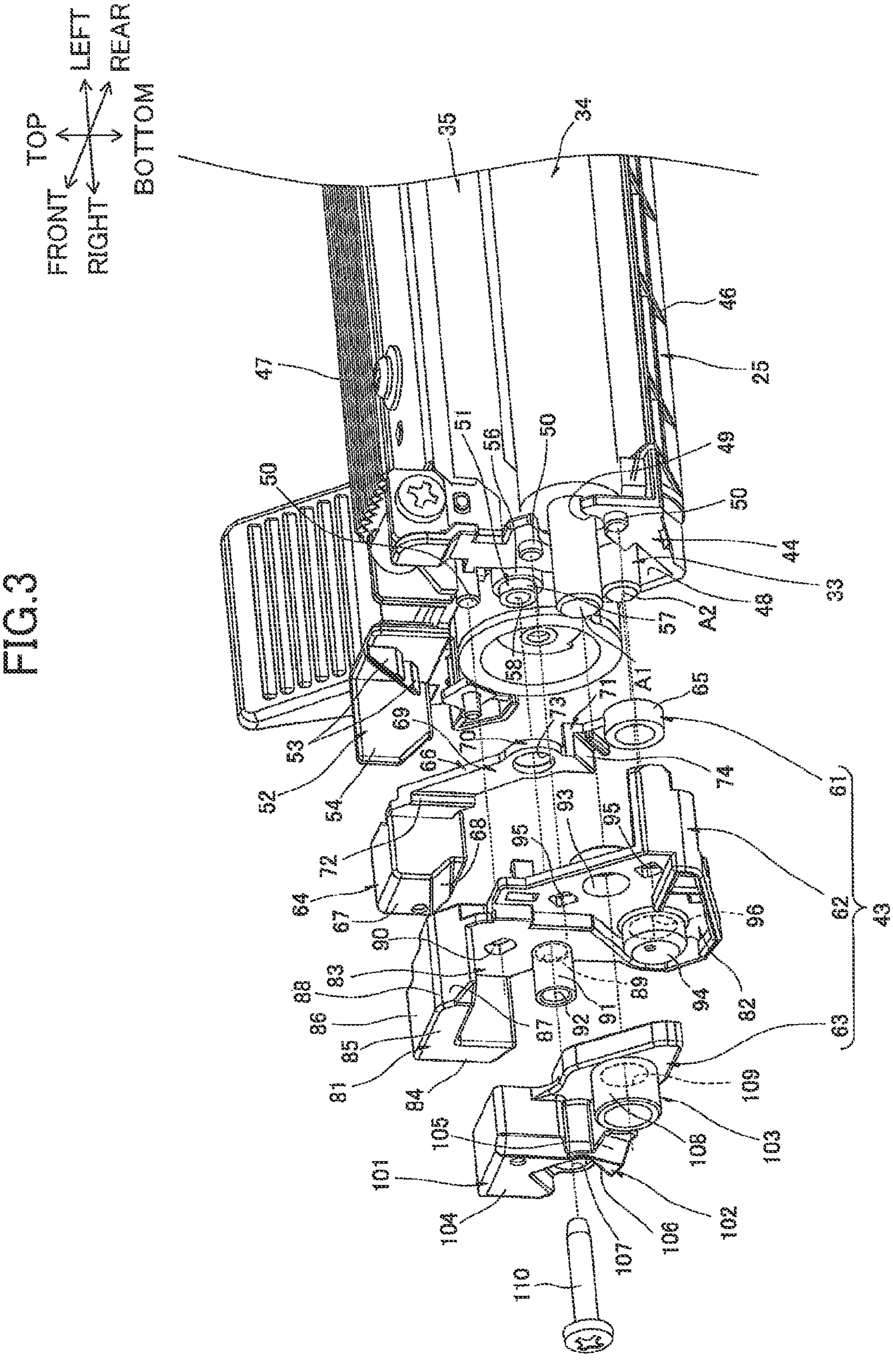
FIG. 3 is an exploded perspective view of a power supply unit provided on the developing cartridge shown in FIG. 2 as viewed from right and rear.

As shown in FIGS. 2 and 3, the developing cartridge 19 includes the developing-cartridge frame 25 described above, and a power supply unit 43 provided on the right side of the developing-cartridge frame 25.

A drive unit 42 is provided on the left side of the developing-cartridge frame 25. The drive unit 42 has a gear train (not shown) that receives a drive force inputted from the main casing 2. Further, the following description will include a detailed description of the structure related to power supply for the developing cartridge 19 (the structure on the right side of the developing cartridge 19), but will omit a description of the structure related to the drive force inputted into the developing cartridge 19 (the structure on the left side of the developing cartridge 19).

Further, in the following description of the developing cartridge 19, descriptions related to the developing cartridge 19 will be given under the assumption that the side of the developing cartridge 19 in which the developing roller 34 is provided is the rear side, and the side in which the thickness-regulating blade 35 is provided is the top. That is, the top, bottom, front, and rear directions related to the developing cartridge 19 differ slightly from the top, bottom, front, and rear directions related to the printer 1. When the developing cartridge 19 is mounted in the printer 1, the rear side of the developing cartridge 19 faces the upper rear side of the printer 1, and the front side of the developing cartridge 19 faces the lower front side of the printer 1.

(1) Developing-Cartridge Frame

Figure 4:
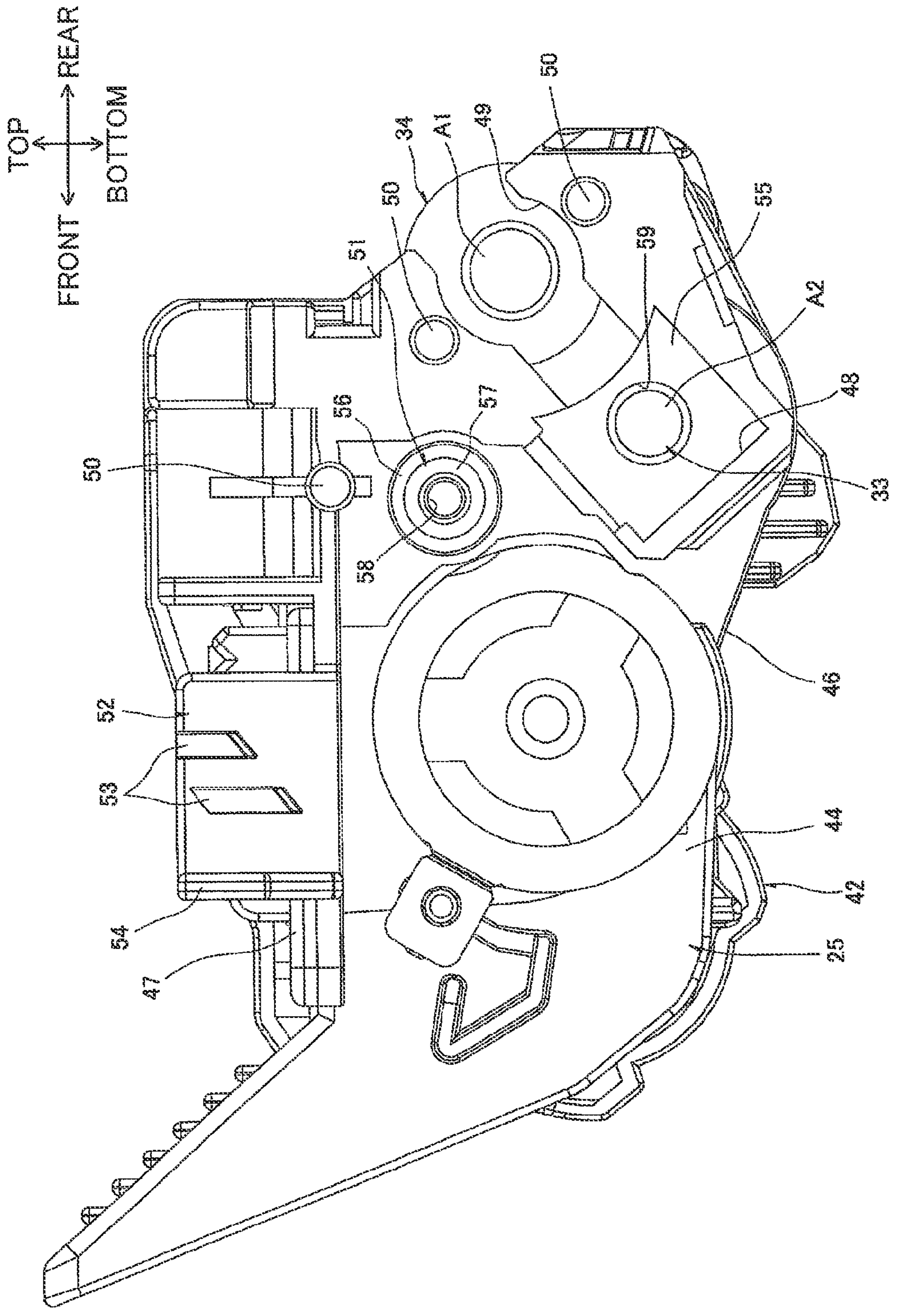
FIG. 4 is a right side view of a cartridge frame shown in FIG. 3.

As shown in FIGS. 3 and 4, the developing-cartridge frame 25 is formed with a box-like shape that is elongated in the left-right direction and is open on the rear side. More specifically, the developing-cartridge frame 25 includes a right wall 44, a left wall (not shown), a front wall 45 (see FIG. 1), a bottom wall 46, and a top wall 47.

The right wall 44 and the left wall (not shown) are formed with a general rectangular shape in a side view that is elongated in the vertical and front-rear directions. The right wall 44 and the left wall are disposed on opposing sides of the developing-cartridge frame 25 in the left-right direction. Each of the right wall 44 and the left wall are formed with a developing-roller-shaft exposing hole 49 and a supply-roller-shaft exposing hole 48.

The developing-roller-shaft exposing holes 49 are formed in the rear ends of the right wall 44 and the left wall (not shown) in the approximate vertical center region thereof. The developing-roller-shaft exposing holes 49 have a general circular shape in a side view and penetrate the right wall 44 and the left wall in the left-right direction. The diameter of the developing-roller-shaft exposing holes 49 is greater than the outer diameter of the rotational shaft in the developing roller 34 (hereinafter called the developing-roller shaft A1). The developing-roller-shaft exposing holes 49 are also open on the upper rear side.

The supply-roller-shaft exposing holes 48 are formed near the bottom end portions of the corresponding right wall 44 and the left wall (not shown) and are positioned on the lower front sides of the respective developing-roller-shaft exposing holes 49. The supply-roller-shaft exposing holes 48 are formed in a general rectangular shape in a side view and penetrate the right wall 44 and the left wall in the left-right direction. The dimensions of the supply-roller-shaft exposing holes 48 are greater than the outer diameter of the rotational shaft in the supply roller 33 (hereinafter called the supply-roller shaft A2). Further, the upper rear sides of the supply-roller-shaft exposing holes 48 are in communication with the lower front sides of the corresponding developing-roller-shaft exposing holes 49. Each of the supply-roller-shaft exposing holes 48 is provided with a shaft seal 55 fitted therein.

The shaft seal 55 is formed of a resinous sponge or the like. The shaft seal 55 has a general square columnar shape that is substantially rectangular in a side view and has a slightly larger outer dimension than the dimensions of the supply-roller-shaft exposing hole 48. A through-hole 59 having a slightly smaller diameter than the outer diameter of the supply-roller shaft A2 is formed at the approximate center of the shaft seal 55 when viewed from the side. The supply-roller shaft A2 is inserted into the through-hole 59.

The left and right ends of the developing-roller shaft A1 are exposed on the outer left-right sides of the corresponding right wall 44 and the left wall (not shown) through the developing-roller-shaft exposing holes 49. The left and right ends of the supply-roller shaft A2 are exposed on the outer left-right sides of the right wall 44 and the left wall through the corresponding supply-roller-shaft exposing holes 48. Note that the left ends of the developing-roller shaft A1 and the supply-roller shaft A2 are coupled to a gear train (not shown) of the drive unit 42 so that the drive unit 42 can transmit a drive force to the developing-roller shaft A1 and the supply-roller shaft A2.

The right wall 44 is also provided with a plurality of (three) positioning protrusions 50, a threaded part 51, and a supply-electrode opposing part 52.

The positioning protrusions 50 are arranged with one positioning protrusion 50 on the lower rear side of the developing-roller-shaft exposing hole 49, one on the upper front side of the developing-roller-shaft exposing hole 49, and one above the threaded part 51. The positioning protrusions 50 are formed in a general columnar shape and protrude rightward from the right surface of the right wall 44.

The threaded part 51 is disposed above the supply-roller-shaft exposing hole 48. The threaded part 51 is integrally provided with a large-diameter part 56, and a small-diameter part 57.

The large-diameter part 56 is formed in a general cylindrical shape and protrudes rightward from the right surface of the right wall 44.

The small-diameter part 57 is formed in a general cylindrical shape that is coaxial with the large-diameter part 56 and protrudes rightward from the right surface of the large-diameter part 56. The inner diameter of the small-diameter part 57 is equivalent to the inner diameter of the large-diameter part 56, while the outer diameter of the small-diameter part 57 is smaller than the outer diameter of the large-diameter part 56.

The large-diameter part 56 and the small-diameter part 57 share an inner circumferential surface 58 on which a thread ridge is formed continuously across both the large-diameter part 56 and the small-diameter part 57.

The supply-electrode opposing part 52 is formed in a plate shape that is generally rectangular in a side view and that extends upward from the top edge of the right wall 44 in the approximate front-rear center thereof. The supply-electrode opposing part 52 includes a plurality of (two) ridges 53, and a protection wall 54.

The ridges 53 are formed in a plate shape having a general triangular shape in a front view, with its apex oriented rightward so as to protrude rightward from the approximate front-rear center of the supply-electrode opposing part 52. Further, the ridges 53 are arranged parallel to each other and are spaced apart in a direction diagonally between the lower front side and the upper rear side.

The protection wall 54 is formed in a plate shape that is generally rectangular in a rear side view and extends rightward from the front edge of the supply-electrode opposing part 52 at the front side of the ridges 53.

The front wall 45 (see FIG. 1) has a general plate shape that is elongated in the left-right direction. The front wall 45 integrally bridges the front edges of the right wall 44 and the left wall (not shown).

The bottom wall 46 is formed in a general plate shape that is elongated in the left-right direction. The bottom wall 46 extends continuously rearward from the bottom edge of the front wall 45 and integrally bridges the bottom edges of the right wall 44 on the left wall (not shown). Note that the rear edge of the bottom wall 46 curves upward and rearward to conform to the circumferential surface of the supply roller 33 and subsequently extends diagonally upward toward the rear so as to cover the bottom of the developing roller 34.

The top wall 47 is formed in a general plate shape that is elongated in the left-right direction and is arranged in opposition to the top edges of the front wall 45, the right wall 44, and the left wall (not shown). The peripheral edges of the top wall 47 are fixed to the top edges of the front wall 45, the right wall 44, and the left wall through welding or another method.

(2) Power Supply Unit

As shown in FIGS. 2 and 3, the power supply unit 43 includes a supply electrode 61, a bearing member 62 as an example of the insulating member, and a developing electrode 63.

(2-1) Supply Electrode

Figure 5:
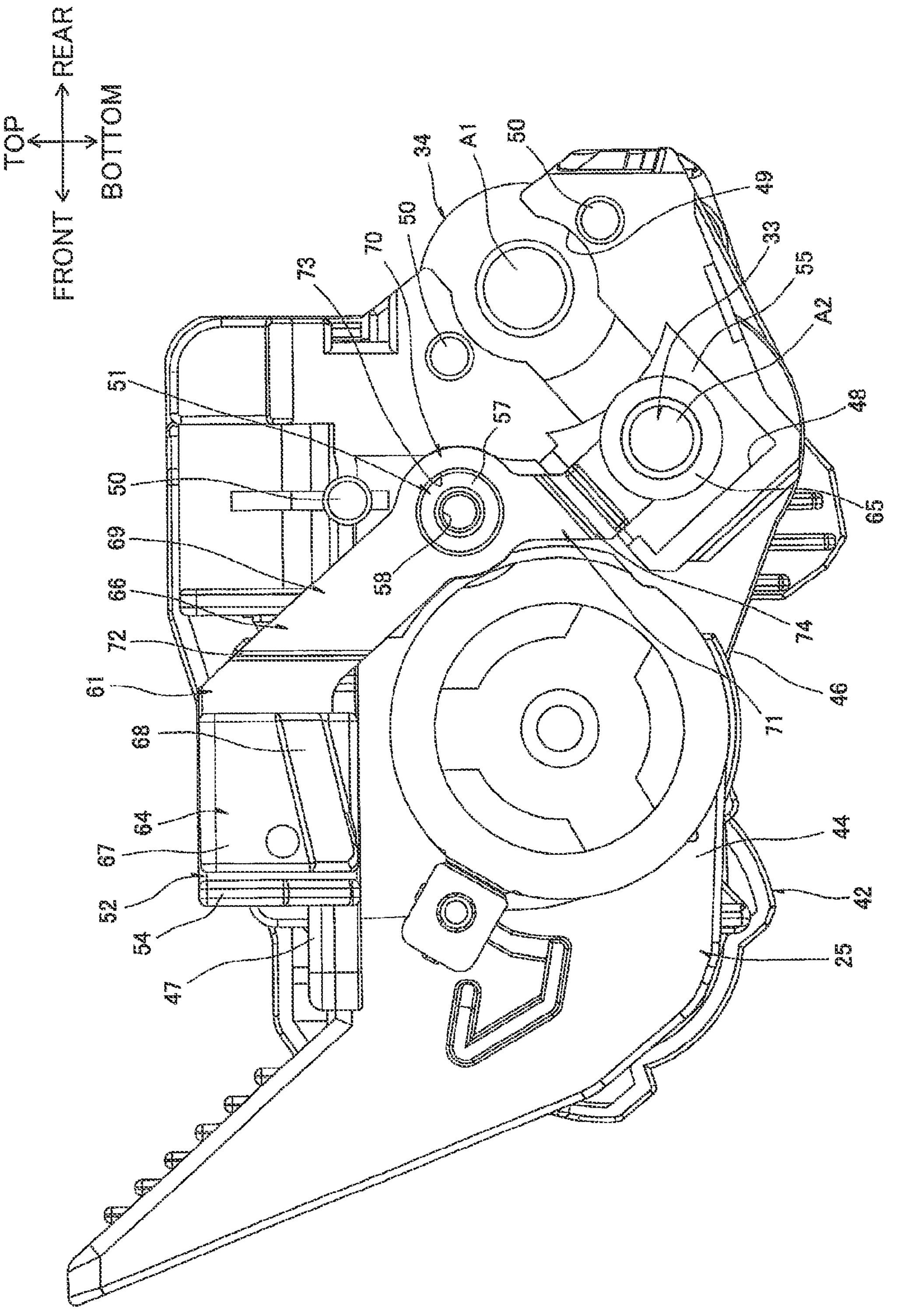
FIG. 5 is a right side view showing a state where the supply electrode is mounted on the cartridge frame shown in FIG. 4.

As shown in FIGS. 3 and 5, the supply electrode 61 is formed of a conductive resin material and has a rod-like shape that is elongated in a direction diagonally between the upper front side and the lower rear side. The supply electrode 61 is integrally provided with a supply-side contact part 64 as an example of the supply-side contact part of the present invention, a coupling part 66, and a supply-roller-shaft insertion part 65.

The supply-side contact part 64 is disposed on the upper front end portion of the supply electrode 61. The supply-side contact part 64 is formed in a square cylindrical shape that has a general rectangular shape in a side view. The supply-side contact part 64 is elongated in the left-right direction with the right end closed and the left end opened. The right surface of the supply-side contact part 64 is divided into a contact surface 67 as an example of the supply contact, and a guide surface 68.

The contact surface 67 constitutes the upper half of the right surface on the supply-side contact part 64 and is elongated vertically.

The guide surface 68 constitutes the lower half of the right surface on the supply-side contact part 64 and slopes continuously downward toward the left from the bottom edge of the contact surface 67.

The coupling part 66 is formed in a plate shape that is bent like a crank and is elongated in a diagonal direction between the upper front side and the lower rear side. More specifically, the coupling part 66 includes a first coupling part 69, a fitting part 70, and a second coupling part 71.

The first coupling part 69 constitutes the upper front half of the coupling part 66. The first coupling part 69 is formed in a rod-like shape and extends diagonally downward and rearward from the left edge on the rear side of the supply-side contact part 64. Here, the upper front end portion of the first coupling part 69 is bent leftward to form a step part 72. The step part 72 is elongated vertically.

The fitting part 70 has a general circular shape in a side view and is provided continuously on the lower rear edge of the first coupling part 69. The fitting part 70 is formed with a supply-side insertion hole 73.

The supply-side insertion hole 73 is formed in a general circular shape in a side view and penetrates the radial center region of the fitting part 70 in the left-right direction. The supply-side insertion hole 73 and the fitting part 70 share the same center. The diameter of the supply-side insertion hole 73 is greater than the outer diameter of the small-diameter part 57 constituting the threaded part 51 and smaller than the outer diameter of the large-diameter part 56. Further, the difference between the diameter of the supply-side insertion hole 73 and the outer diameter of the small-diameter part 57 is greater than the difference between the inner diameter of the supply-roller-shaft insertion part 65 and the outer diameter of the supply-roller shaft A2.

The second coupling part 71 is formed in a bent rod-like shape. More specifically, the second coupling part 71 extends continuously downward from the bottom edge of the fitting part 70, and subsequently bends and extends diagonally downward and rearward at its bottom edge. Here, the second coupling part 71 bends toward the left in a vertical midpoint thereof to form a step part 74. The step part 74 is elongated in a diagonal direction between the upper rear side and the lower front side.

The supply-roller-shaft insertion part 65 is provided on the lower rear end portion of the supply electrode 61 and is formed continuously with the lower rear edge of the second coupling part 71. The supply-roller-shaft insertion part 65 is formed in a general cylindrical shape and is elongated in the left-right direction. The inner diameter of the supply-roller-shaft insertion part 65 is slightly greater than (approximately equal to) the outer diameter of the supply-roller shaft A2.

(2-2) Bearing Member

Figure 6:
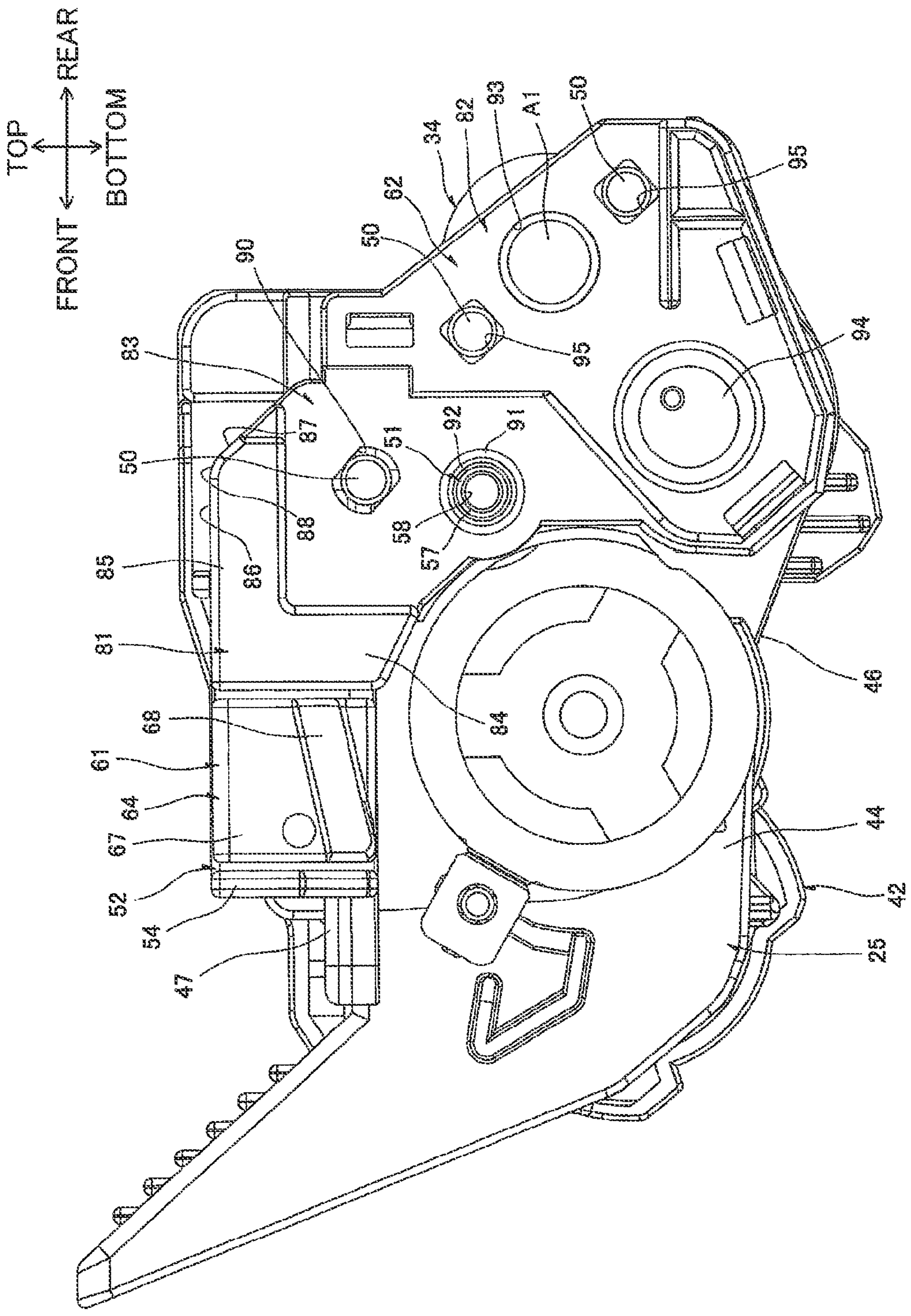
FIG. 6 is a right side view showing a state where a bearing member is mounted on the cartridge frame shown in FIG. 5.

As shown in FIGS. 3 and 6, the bearing member 62 is formed of an insulating resin material in a plate shape that is generally rectangular in a side view and elongated in a direction diagonally between the upper front side and the lower rear side. The bearing member 62 is formed of a harder material than the supply electrode 61 and the developing electrode 63. The bearing member 62 is integrally provided with an insulating part 81 as an example of the contact receiving part, a fixing part 83, and a bearing part 82.

The insulating part 81 is disposed on the upper front end portion of the bearing member 62. The insulating part 81 is formed in a square cylindrical shape that has a general L-shape in a side view. The insulating part 81 is elongated in the left-right direction and closed on the right end. The insulating part 81 includes a first insulating part 84, and a second insulating part 85.

The first insulating part 84 constitutes the front portion of the insulating part 81. The first insulating part 84 is formed in a general rectangular shape in a side view and is elongated vertically with substantial thickness in the front-rear direction.

The second insulating part 85 constitutes the rear portion of the insulating part 81. The second insulating part 85 is formed in a general rectangular shape in a side view and extends continuously rearward from the top end of the first insulating part 84. The second insulating part 85 has substantial thickness in the vertical direction. The second insulating part 85 has a top surface 86 that extends in the front-rear direction and a rear surface 87 that extends continuously in a direction angled downward toward the rear from the rear edge of the top surface on the first insulating part 84. A connecting part 88 disposed between the top surface 86 and the rear surface 87 is formed in a general arc shape that curves downward toward the rear.

The fixing part 83 is formed in a general plate shape that extends continuously downward and rearward from the left edge on the rear part of the first insulating part 84 and the left edge on the bottom part of the second insulating part 85. The fixing part 83 is formed with a screw insertion hole 89 (indicated by a dashed line in FIG. 3) and a fixing-part-side fitting hole 90. The fixing part 83 is also provided with a screw insertion part 91 as an example of the insertion portion of the present invention.

The screw insertion hole 89 is formed in the approximate vertical center region of the bearing member 62. The screw insertion hole 89 has a general circular shape in a side view and penetrates the bearing member 62 in the left-right direction. The screw insertion hole 89 has a larger diameter than the diameters of the large-diameter part 56 and the small-diameter part 57 constituting the threaded part 51.

The fixing-part-side fitting hole 90 is formed in the upper side of the screw insertion hole 89 and penetrates in the left-right direction. The fixing-part-side fitting hole 90 is an elongate hole whose longitudinal dimension extends diagonally between the upper front side and the lower rear side. The dimension of the fixing-part-side fitting hole 90 in a diagonal direction between the lower front side and the upper rear side is slightly greater than (approximately equal to) the outer diameter of the positioning protrusion 50.

The screw insertion part 91 is formed in a general cylindrical shape and protrudes rightward from the peripheral edge of the screw insertion hole 89. The screw insertion part 91 shares a central axis with the screw insertion hole 89. The screw insertion part 91 is in communication with the screw insertion hole 89 at its left end and has an inner diameter equivalent to that of the screw insertion hole 89. The screw insertion part 91 has an inner circumferential surface 92 on which a thread ridge is not formed.

The bearing part 82 is connected to the lower rear end of the fixing part 83. The bearing part 82 is formed in a plate shape having a general rectangular shape in a side view. The bearing part 82 is formed with a developing-roller-shaft insertion hole 93, a plurality of (two) bearing-part-side fitting holes 95, and a supply-roller-shaft insertion hole 96. The fixing part 83 is also provided with a supply-roller-shaft cover part 94.

The developing-roller-shaft insertion hole 93 is formed in the approximate vertical center region on the rear end portion of the bearing part 82. The developing-roller-shaft insertion hole 93 has a general circular shape in a side view and penetrates the bearing part 82 in the left-right direction. The diameter of the developing-roller-shaft insertion hole 93 is slightly larger than (approximately equal to) the outer diameter of the developing-roller shaft A1.

The bearing-part-side fitting holes 95 are provided one each on the lower rear side of the developing-roller-shaft insertion hole 93 and the upper front side of the developing-roller-shaft insertion hole 93. The bearing-part-side fitting holes 95 have a general square shape in a side view. The inner dimensions of the bearing-part-side fitting holes 95 are slightly larger than (approximately equal to) the outer diameter of the positioning protrusion 50.

The supply-roller-shaft insertion hole 96 is formed on the lower front side of the developing-roller-shaft insertion hole 93. The supply-roller-shaft insertion hole 96 has a general circular shape in a side view and penetrates in the left-right direction. The inner diameter of the supply-roller-shaft insertion hole 96 is slightly larger than (approximately equal to) the outer diameter of the supply-roller shaft A2.

The supply-roller-shaft cover part 94 is formed in a general cylindrical shape with the right end closed. The supply-roller-shaft cover part 94 protrudes rightward from the peripheral edge of the supply-roller-shaft insertion hole 96 and shares a central axis with the supply-roller-shaft insertion hole 96. The supply-roller-shaft cover part 94 is in communication with the supply-roller-shaft insertion hole 96 on its left end and has an inner diameter equivalent to the inner diameter of the supply-roller-shaft insertion hole 96.

(2-3) Developing Electrode

As shown in FIGS. 2 and 3, the developing electrode 63 is formed in a plate shape that has a general rectangular shape in a side view and a longitudinal dimension elongated in a direction diagonally between the upper front side and the lower rear side. The developing electrode 63 is formed of a conductive resin material. The developing electrode 63 is integrally provided with a developing-side contact part 101 as an example of the developing-side contact part of the present invention, a fixing part 102, and a developing-roller-shaft fitting part 103.

The developing-side contact part 101 is arranged at the upper front end of the developing electrode 63. The developing-side contact part 101 has a square cylindrical shape that is elongated in the left-right direction and closed on the right end and has a general rectangular shape in a side view. The right surface of the developing-side contact part 101 constitutes a contact surface 104 as an example of the developing contact of the present invention. The contact surface 104 extends in the front-rear and vertical directions.

The fixing part 102 extends continuously downward and rearward from the bottom end of the developing-side contact part 101. The fixing part 102 has a block-like shape with a left-right dimension equivalent to that of the developing-side contact part 101. A screw accommodating part 106 and a guiding surface 105 are formed on the fixing part 102.

The screw accommodating part 106 is a recess formed in the right surface of the fixing part 102 beneath the developing-side contact part 101. The screw accommodating part 106 has a general rectangular shape in a side view and is open on the lower front side. The left-right dimension (depth) of the screw accommodating part 106 is greater than the left-right dimension of the head portion of a screw 110 (described later). The inner dimensions of the screw accommodating part 106 are greater than the diameter of the head portion of the screw 110. A developing-side insertion hole 107 is also formed in the left wall of the screw accommodating part 106.

The developing-side insertion hole 107 is formed in a general circular shape in a side view and penetrates the center region of the left wall constituting the screw accommodating part 106 in the left-right direction. The diameter of the developing-side insertion hole 107 is larger than the outer diameter of the screw insertion part 91 provided on the bearing member 62. Further, the difference between the diameter of the developing-side insertion hole 107 and the outer diameter of the screw insertion part 91 is greater than the difference between the inner diameter of a developing-roller-shaft cover part 108 (described later) and the outer diameter of the developing-roller shaft A1.

The guiding surface 105 is the lower rear portion of the right surface on the fixing part 102 positioned on the lower rear side of the screw accommodating part 106. The guiding surface 105 slopes leftward toward the lower rear side.

The developing-roller-shaft fitting part 103 is formed in a general plate shape and extends continuously rearward from the left end of the fixing part 102. The developing-roller-shaft fitting part 103 is formed with an insertion hole 109 (indicated by a dashed line in FIG. 3). The developing-roller-shaft fitting part 103 is also provided with the developing-roller-shaft cover part 108.

The insertion hole 109 penetrates the developing-roller-shaft fitting part 103 at a position below and rearward of the developing-side insertion hole 107. The insertion hole 109 has a general circular shape in a side view and penetrates the developing-roller-shaft fitting part 103 in the left-right direction. The diameter of the insertion hole 109 is slightly greater than (approximately equal to) the outer diameter of the developing-roller shaft A1.

The developing-roller-shaft cover part 108 is formed in a general cylindrical shape and protrudes rightward from the peripheral edge of the insertion hole 109. The developing-roller-shaft cover part 108 shares a central axis with the insertion hole 109. The developing-roller-shaft cover part 108 is in communication with the insertion hole 109 at its left end and has an inner diameter equal to the inner diameter of the insertion hole 109.

(2-4) Assembled State of the Power Supply Unit Relative to the Developer-Cartridge Frame As shown in FIGS. 3 and 5, the supply-side contact part 64 covers the ridges 53 of the supply-electrode opposing part 52, and the supply-roller-shaft insertion part 65 is fitted around the radial outside of the supply-roller shaft A2. In this way, the supply electrode 61 is supported on the right wall 44 of the developing-cartridge frame 25.

Thus, the supply electrode 61 is electrically connected to the supply-roller shaft A2.

In addition, the small-diameter part 57 of the threaded part 51 is loosely inserted into the supply-side insertion hole 73. The amount of play between the supply-side insertion hole 73 and the small-diameter part 57 of the threaded part 51 is the difference between the diameter of the supply-side insertion hole 73 and the outer diameter of the small-diameter part 57. Further, the supply-side contact part 64 is disposed in confrontation with the rear side of the protection wall 54 constituting the developing-cartridge frame 25, with a gap therebetween. The step part 72 of the first coupling part 69 is disposed on the rear side of the supply-electrode opposing part 52 constituting the developing-cartridge frame 25. Further, the step part 74 of the second coupling part 71 is disposed in the upper front side of the supply-roller-shaft exposing hole 48.

As shown in FIGS. 3 and 6, the bearing member 62 is supported on the right wall 44 of the developing-cartridge frame 25 while overlapping the right sides of the supply-roller-shaft insertion part 65 and the coupling part 66 of the supply electrode 61 in the left-right direction.

The developing-roller shaft A1 is also rotatably inserted through the developing-roller-shaft insertion hole 93. The positioning protrusion 50 positioned on the lower rear side of the developing-roller-shaft exposing hole 49 is fitted into the bearing-part-side fitting hole 95 provided on the lower rear side of the developing-roller-shaft insertion hole 93. The positioning protrusion 50 provided on the upper front side of the developing-roller-shaft exposing hole 49 is fitted into the bearing-part-side fitting hole 95 provided on the upper front side of the developing-roller-shaft insertion hole 93.

In this way, the bearing member 62 is positioned relative to the developing-cartridge frame 25 and rotatably supports the developing roller 34.

Further, the supply-roller shaft A2 is rotatably fitted in the supply-roller-shaft cover part 94. The positioning protrusion 50 disposed above the threaded part 51 is fitted into the fixing-part-side fitting hole 90.

Figure 8:
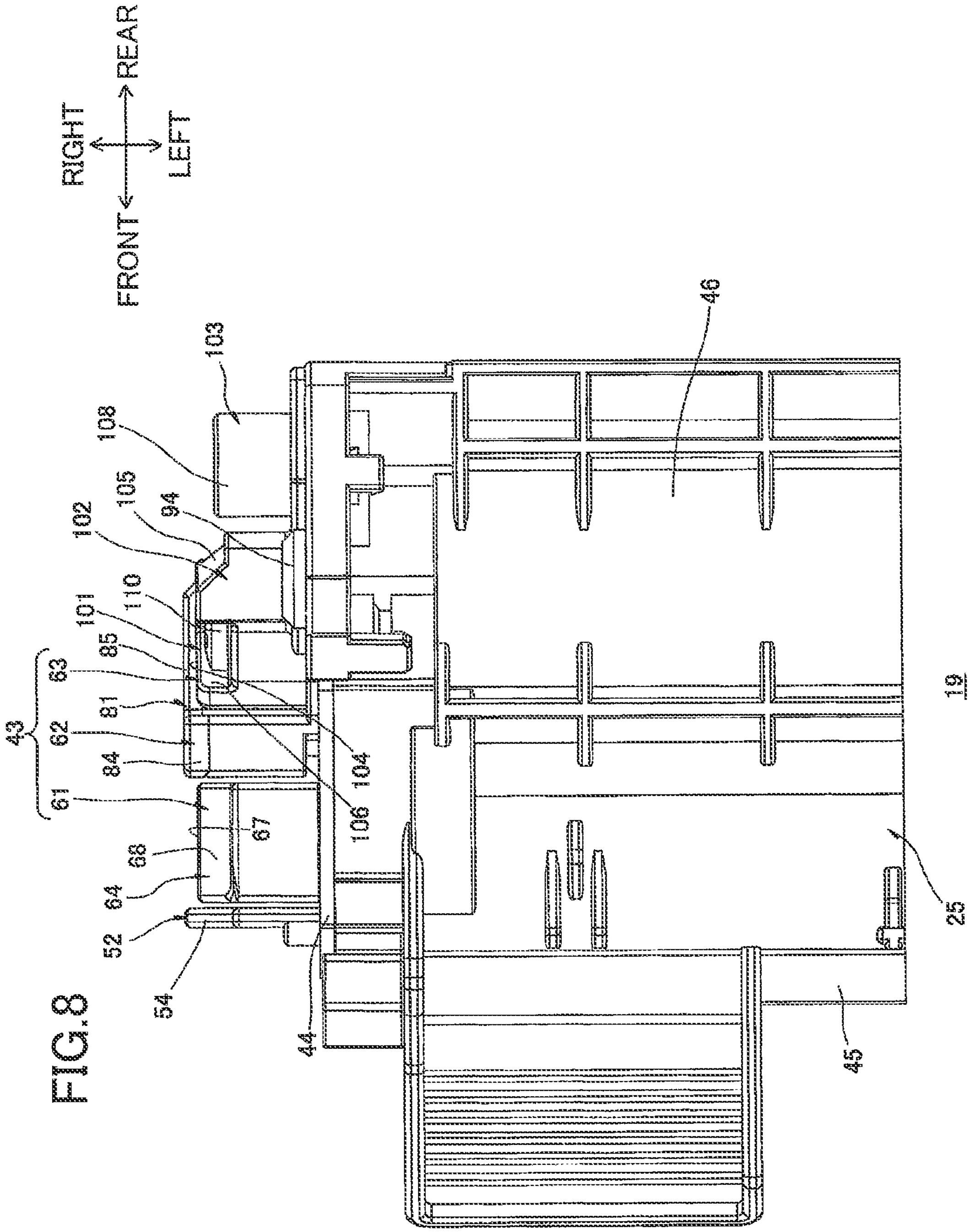
FIG. 8 is a bottom view of the developing cartridge shown in FIG. 2.

As shown in FIGS. 6 and 8, the insulating part 81 is arranged to confront the rear side of the supply-side contact part 64 constituting the supply electrode 61 in the front-rear direction, with a gap therebetween. The first insulating part 84 protrudes rightward such that its right surface is further right than the contact surface 67 of the supply-side contact part 64.

Figure 7:
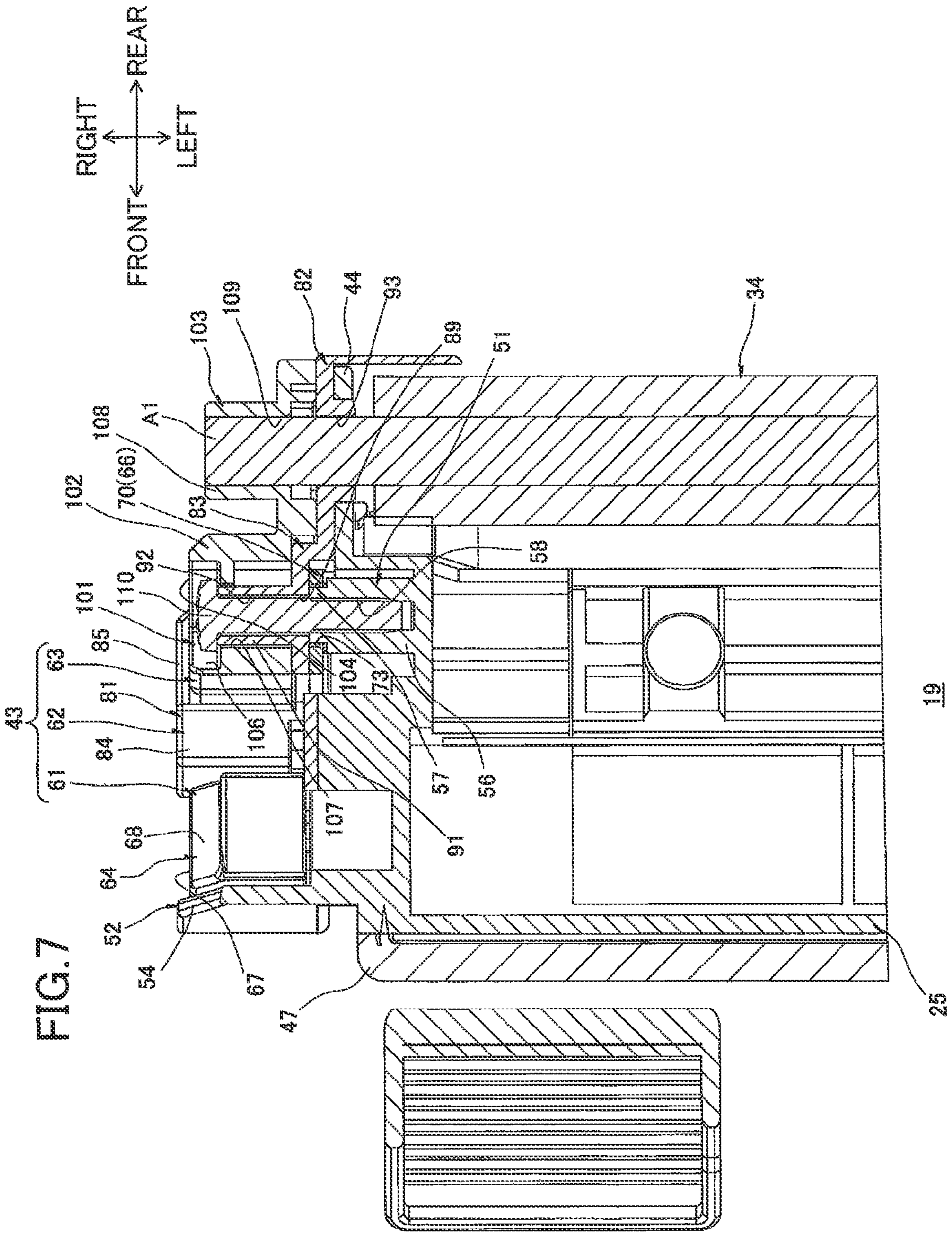
FIG. 7 is a cross-sectional view of the developing cartridge shown in FIG. 2 taken along a line VII-VII.

As shown in FIGS. 6 and 7, the screw insertion part 91 is disposed in confrontation with the right end of the threaded part 51, with the left surface of the screw insertion part 91 contacting the right surface of the threaded part 51 from the right side. Internal spaces in the screw insertion part 91 and the threaded part 51 are in communication with each other in the left-right direction.

As shown in FIGS. 2 and 3, the developing electrode 63 is supported on the bearing member 62 by fitting the developing-roller-shaft cover part 108 around the developing-roller shaft A1 so that the developing electrode 63 overlaps the fixing part 83 and the upper half of the bearing part 82 from the right side.

Thus, the developing electrode 63 is electrically connected to the developing-roller shaft A1 and insulated from the supply electrode 61.

Specifically, the developing electrode 63 is provided on the right side of the supply electrode 61 with the bearing member 62 interposed therebetween in the left-right direction. In other words, the developing electrode 63 opposes the right side of the supply electrode 61 with a gap therebetween, and the bearing member 62 is disposed between the supply electrode 61 and the developing electrode 63.

As shown in FIGS. 2 and 8, the developing-side contact part 101 of the developing electrode 63 is provided on the rear side of the first insulating part 84 and beneath the second insulating part 85. More specifically, the developing-side contact part 101 is separated from the first insulating part 84 in the front-rear direction and confronts but is separated from the second insulating part 85 vertically.

Further, the first insulating part 84 of the bearing member 62 is disposed between the contact surface 104 of the developing electrode 63 and the contact surface 67 of the supply electrode 61. The first insulating part 84 protrudes farther rightward than the contact surface 104 of the developing electrode 63 and the contact surface 67 of the supply electrode 61.

As shown in FIG. 7, the screw insertion part 91 is inserted into the developing-side insertion hole 107 with play. The amount of play between the developing-side insertion hole 107 and the screw insertion part 91 is the difference between the diameter of the developing-side insertion hole 107 and the outer diameter of the screw insertion part 91. Further, the right end (outer left-right end) of the screw insertion part 91 protrudes slightly to the right of (outward in the left-right direction from) the left wall (inner left-right wall) of the screw accommodating part 106.

In this way, the bearing member 62 is interposed between the supply electrode 61 and the developing electrode 63 and insulates the supply electrode 61 and the developing electrode 63 from each other.

The supply electrode 61, the bearing member 62, and the developing electrode 63 are fixed to the developing-cartridge frame 25 by a common screw 110.

More specifically, the screw 110 is inserted through the screw insertion part 91 and screwed into the threaded part 51 of the developing-cartridge frame 25 such that the right half of its shaft is accommodated in the screw insertion part 91, and the left half of its shaft is screwed into the threaded part 51. Further, the bearing surface of the screw 110 is in contact with the right end of the screw insertion part 91 from the right side thereof.

In other words, the screw 110 is only in contact with the screw insertion part 91 and the threaded part 51, and does not contact the developing electrode 63 and the supply electrode 61.

The right side of the head of the screw 110 is positioned near (slightly leftward of) the contact surface 104 of the developing-side contact part 101.

3. Drum Cartridge

Figure 9:
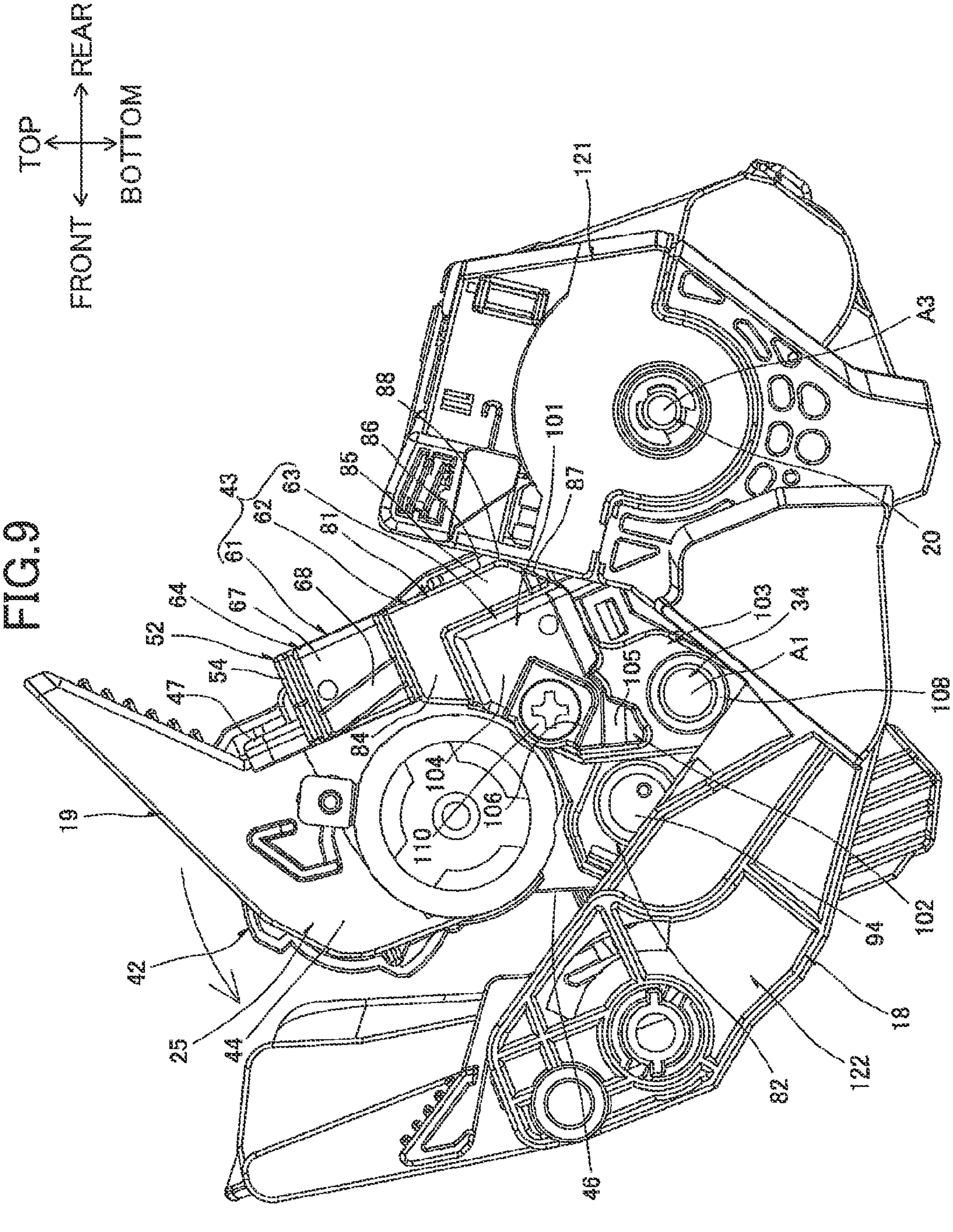
FIG. 9 is a schematic explanation view illustrating a mounting operation of the developing cartridge relative to a drum cartridge, wherein a rear end portion of the developing cartridge is inserted into a cartridge accommodating portion of the drum cartridge.

As shown in FIG. 9, the drum cartridge 18 is provided with a drum accommodating section 121 that accommodates the photosensitive drum 20, and a cartridge mounting section 122 in which the developing cartridge 19 is mounted.

In the following description of the drum cartridge 18, directions related to the drum cartridge 18 will be specified based on the orientation of the drum cartridge 18 when resting on a level surface, and specifically will refer to the directions indicated by arrows in FIG. 9. That is, the up, down, front, and rear directions related to the drum cartridge 18 differ slightly from the up, down, front, and rear directions related to the printer 1. When the drum cartridge 18 is mounted in the printer 1, the rear side of the drum cartridge 18 faces the upper rear side of the printer 1, and the front side of the drum cartridge 18 faces the lower front side of the printer 1.

The drum accommodating section 121 is provided in the rear region of the drum cartridge 18. The drum accommodating section 121 has a general cylindrical shape that is elongated in the left-right direction.

Note that the photosensitive drum 20 is provided with a drum shaft A3 that extends along the central axis of the photosensitive drum 20 in the left-right direction. The photosensitive drum 20 is rotatably supported in the left and right side walls of the drum accommodating section 121 by the corresponding left and right ends of the drum shaft A3. The left and right ends of the drum shaft A3 penetrate the side walls of the drum accommodating section 121 and protrude outward therefrom in respective left and right directions.

The transfer roller 21 and the scorotron charger 22 described above are also supported in the drum accommodating section 121.

The cartridge mounting section 122 extends continuously forward from the bottom end of the drum accommodating section 121. The cartridge mounting section 122 is a frame-like structure with a closed bottom and an open top.

4. Main Casing

Figure 10:
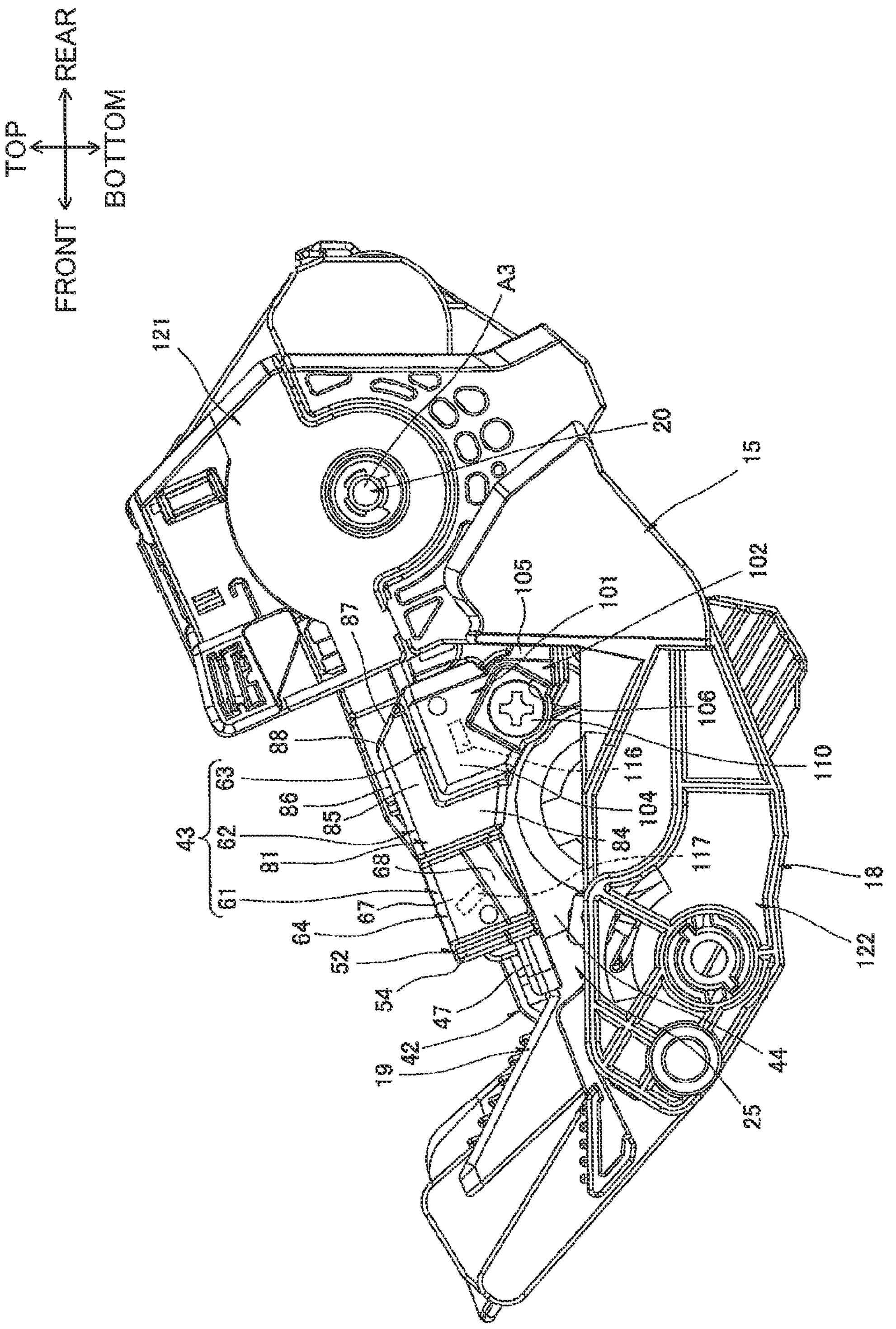
FIG. 10 is a schematic explanation view illustrating a mounting operation of a process cartridge relative to a main casing, wherein the process cartridge is completely mounted in the main casing.

As indicated in phantom in FIG. 10, a device-side developing electrode 116 and a device-side supply electrode 117 are provided on the inner right wall of the main casing 2. The device-side developing electrode 116 is an example of the external developing electrode, and the device-side supply electrode 117 is an example of the external supply electrode.

Directions related to the process cartridge 15 will be specified based on the orientation of the process cartridge 15 when the process cartridge 15 is mounted in the printer 1 and the printer 1 is resting on a level surface, and specifically will refer to the directions indicated by arrows in FIG. 10.

The device-side developing electrode 116 is provided in the rear section of the main casing 2 and is positioned to contact the contact surface 104 of the developing-side contact part 101 when the process cartridge 15 is completely mounted in the main casing 2. The device-side developing electrode 116 can be displaced in the left and right directions and is constantly urged leftward. The device-side developing electrode 116 is electrically connected to a power supply (not shown) provided in the main casing 2.

The device-side supply electrode 117 is provided on the front side of the device-side developing electrode 116 in the rear section of the main casing 2 and is positioned to contact the contact surface 67 of the supply-side contact part 64 when the process cartridge 15 is completely mounted in the main casing 2. The device-side supply electrode 117 can be displaced in the left and right directions and is constantly urged leftward. The device-side supply electrode 117 is electrically connected to the power supply (not shown) in the main casing 2.

5. Mounting the Developing Cartridge in the Main Casing (1) Mounting the Developing Cartridge in the Drum Cartridge To mount the developing cartridge 19 in the main casing 2, first the developing cartridge 19 is mounted in the drum cartridge 18.

To mount the developing cartridge 19 in the drum cartridge 18, first the operator inserts the rear end of the developing cartridge 19 down into the rear end of the cartridge mounting section 122, as illustrated in FIG. 9.

Next, the operator rotates the front end of the developing cartridge 19 downward and forward about the rear end of the developing cartridge 19, as indicated by the arrow in FIG. 9, while pushing the rear end of the developing cartridge 19 toward the drum accommodating section 121 of the drum cartridge 18.

Through this operation, the rear end of the second insulating part 85 (the connecting part 88 for connecting the top surface 86 and the rear surface 87) constituting the bearing member 62 on the rear end of the developing cartridge 19 contacts the right end of the drum accommodating section 121 from the front side thereof.

Next, the operator rotates the developing cartridge 19 counterclockwise in a right side view about the rear end of the second insulating part 85 (the connecting part 88). Hence, the rear end of the second insulating part 85 (the connecting part 88) functions as a guide part for guiding mounting of the developing cartridge 19 in the drum cartridge 18.

When the front end of the developing cartridge 19 is accommodated in the front region of the cartridge mounting section 122, the process of mounting the developing cartridge 19 in the drum cartridge 18 is completed, and the process cartridge 15 is formed (see FIG. 10).

To remove the developing cartridge 19 from the drum cartridge 18, the mounting operation described above is performed in reverse on the developing cartridge 19 and the drum cartridge 18.

That is, the operator rotates the front end of the developing cartridge 19 upward and rearward about the rear end of the developing cartridge 19, and subsequently the operator lifts the developing cartridge 19 upward and removes the developing cartridge 19 from the drum cartridge 18.

During this removal operation, the rear end of the second insulating part 85 (the connecting part 88) contacts the right end of the drum accommodating section 121 on the front side at a point in the rotation of the developing cartridge 19.

After the rear end of the second insulating part 85 (the connecting part 88) has contacted the drum accommodating section 121, the developing cartridge 19 rotates clockwise in a right side view about the rear end of the second insulating part 85 (the connecting part 88). Hence, the rear end of the second insulating part 85 (the connecting part 88) guides removal of the developing cartridge 19 from the drum cartridge 18.

(2) Mounting the Process Cartridge in the Main Casing

To mount the developing cartridge 19 in the main casing 2, next the process cartridge 15 is mounted in the main casing 2.

To mount the process cartridge 15 in the main casing 2, first the operator places the top cover 7 of the main casing 2 in the open position, as illustrated in FIG. 1 and described above.

Next, the operator grips the front end of the process cartridge 15 and inserts the process cartridge 15 into the main casing 2 so that the left and right ends of the drum shaft A3 in the photosensitive drum 20 are fitted into the guide parts 37 of the main casing 2.

Next, the operator pushes the process cartridge 15 diagonally downward and rearward along the guide parts 37 and subsequently rotates the process cartridge 15 counterclockwise in a right side view about the drum shaft A3 of the photosensitive drum 20.

Just before the process cartridge 15 is completely mounted in the main casing 2 as the operator continues to rotate the process cartridge 15, the device-side developing electrode 116 inside the main casing 2 contacts from the lower rear side of the guiding surface 105 on the fixing part 102, and the device-side supply electrode 117 inside the main casing 2 contacts the guide surface 68 on the supply-side contact part 64 from below.

Note that the developing-side contact part 101 moves slightly forward at this time an amount equivalent to the play between the developing electrode 63 and the developing-roller shaft A1 and then contacts the first insulating part 84 of the bearing member 62. This contact restricts the developing-roller-shaft cover part 108 from moving any further forward.

The supply-side contact part 64 also moves slightly upward and forward an amount equivalent to the play between the supply electrode 61 and the supply-roller shaft A2 and is disposed in confrontation to the protection wall 54 of the developing-cartridge frame 25, with a slight gap formed between the two in the front-rear direction.

As indicated by a dashed line in FIG. 10, the device-side developing electrode 116 is subsequently displaced rightward against the force urging it leftward as the developing-side developing electrode 116 slides along the slope of the guiding surface 105 in a direction diagonally upward and forward relative to the guiding surface 105. Thereafter, the device-side developing electrode 116 slides diagonally upward and forward relative to the screw 110 and comes into contact with the contact surface 104 above the right surface on the head of the screw 110. Since the right surface on the head of the screw 110 is disposed in proximity to (slightly leftward of) the contact surface 104 of the developing-side contact part 101, as described above (see FIG. 7), the device-side developing electrode 116 slides smoothly over the right surface on the head of the screw 110 while contacting the contact surface 104 at this time, without becoming trapped in the screw accommodating part 106.

Through this contact, the device-side developing electrode 116 and the developing electrode 63 are electrically connected.

Similarly, the device-side supply electrode 117 is displaced rightward against the force urging it leftward while sliding along the slope of the guide surface 68 in a direction upward relative to the guide surface 68 until coming into contact with the contact surface 67. Through this contact, the device-side supply electrode 117 is electrically connected to the supply electrode 61.

The process cartridge 15 is completely mounted in the main casing 2 when the drum shaft A3 of the photosensitive drum 20 is disposed in the rear ends of the guide parts 37 and the front end of the process cartridge 15 is positioned beneath the irradiating path of the laser beam L, as illustrated in FIG. 1.

Subsequently, the operator places the top cover 7 of the main casing 2 in the closed position.

When the printer 1 is operated thereafter, power from a power supply (not shown) in the main casing 2 is supplied to the developing-roller shaft A1 sequentially via the device-side developing electrode 116 and the developing electrode 63 and to the supply-roller shaft A2 sequentially via the device-side supply electrode 117 and the supply electrode 61.

To remove the process cartridge 15 from the main casing 2, the operation for mounting the process cartridge 15 described above is performed in reverse on the process cartridge 15 and main casing 2.

That is, after the top cover 7 is placed in the open position, the process cartridge 15 is pulled diagonally upward and forward.

6. Operational Advantages (1) With the developing cartridge 19 described above, the bearing member 62 is disposed between the developing electrode 63 and the supply electrode 61 in the left-right direction, as illustrated in FIGS. 2 and 3. Accordingly, the developing electrode 63 and the supply electrode 61 can be insulated from each other without being separated in the front-rear direction. In other words, the developing electrode 63 and the supply electrode 61 can be arranged in proximity to each other in the front-rear direction.

As a result, the developing cartridge 19 can be made more compact at least in the front-rear direction while ensuring that the developing electrode 63 and the supply electrode 61 are reliably insulated from each other.

(2) As shown in FIGS. 3 and 6, the bearing member 62 that functions to support the developing roller 34 is also used for insulating the developing electrode 63 and the supply electrode 61.

Since this construction does not require a separate member for being used to insulate the developing electrode 63 and the supply electrode 61, the overall number of parts can be reduced.

(3) As shown in FIG. 2, movement of the developing electrode 63 can be restricted through contact between the developing-side contact part 101 of the developing electrode 63 and the insulating part 81 of the bearing member 62. Similarly, movement of the supply electrode 61 can be restricted through contact between the supply-side contact part 64 of the supply electrode 61 and the insulating part 81 of the bearing member 62.

Accordingly, the bearing member 62 can be used for restricting movement of both the supply electrode 61 and the developing electrode 63, thereby reducing the number of required parts. Further, the bearing member 62 can reliably insulate the developing electrode 63 and the supply electrode 61 by restricting movement of the developing electrode 63 and the supply electrode 61.

(4) As shown in FIG. 8, the bearing member 62 has the first insulating part 84 disposed between the contact surface 104 of the developing-side contact part 101 and the contact surface 67 of the supply-side contact part 64 and extending farther rightward than the contact surface 104 and the contact surface 67.

Hence, the first insulating part 84 can be reliably positioned between the contact surface 104 of the developing-side contact part 101 and the contact surface 67 of the supply-side contact part 64. This configuration ensures a more considerable insulating distance than an arrangement in which the first insulating part 84 extends rightward (outward in the left-right direction) by the same length as the developing-side contact part 101 and the supply-side contact part 64.

Thus, this configuration can reliably insulate the contact surface 104 of the developing-side contact part 101 from the contact surface 67 of the supply-side contact part 64.

(5) As shown in FIG. 7, the developing electrode 63, the bearing member 62, and the supply electrode 61 are all fixed to the right wall 44 of the developing-cartridge frame 25 by a common screw.

Hence, the developing electrode 63, the bearing member 62, and the supply electrode 61 can be fixed to the right wall 44 of the developing-cartridge frame 25 while using fewer parts.

(6) As shown in FIG. 7, the screw 110 can be screwed into the threaded part 51 of the developing-cartridge frame 25 while encased by the screw insertion part 91 of the bearing member 62.

Accordingly, this construction can prevent the shaft of the screw 110 that is inserted through the screw insertion part 91 (right half) and the shaft of the screw 110 screwed into the threaded part 51 (left half) from contacting the developing electrode 63 and the supply electrode 61.

Thus, this construction reliably prevents electricity from being conducted between the developing electrode 63 and the supply electrode 61 through the screw 110.

(7) According to the developing cartridge 19 described above, the screw 110 contacts only the screw insertion part 91 and the threaded part 51 and does not contact the developing electrode 63 and the supply electrode 61.

Hence, this construction can reliably prevent the screw 110 from contacting the developing electrode 63 and the supply electrode 61.

Accordingly, this construction can prevent electricity from being conducted between the developing electrode 63 and the supply electrode 61 via the screw 110.

(8) As shown in FIGS. 3 and 7, the screw 110 can be inserted through the screw insertion part 91 which is inserted through the developing-side insertion hole 107 formed in the developing electrode 63.

Accordingly, the screw insertion part 91 is interposed between the screw 110 and the peripheral edge of the developing-side insertion hole 107, thereby insulating the developing electrode 63 and the screw 110 from each other.

Moreover, since the screw insertion part 91 has a cylindrical shape that is elongated in the left-right direction, the screw insertion part 91 can ensure an insulated condition between the developing electrode 63 and the screw 110 in the left-right direction.

(9) As shown in FIGS. 5 and 7, the screw can be screwed into the threaded part 51 which is inserted into the supply-side insertion hole 73 formed in the supply electrode 61.

Hence, the threaded part 51 is interposed between the screw 110 and the peripheral edge of the supply-side insertion hole 73, thereby insulating the supply electrode 61 and the screw 110 from each other.

Moreover, since the threaded part 51 has a cylindrical shape that is elongated in the left-right direction, the threaded part 51 can ensure an insulating condition between the supply electrode 61 and the screw 110 along a direction orthogonal to the left-right direction.

(10) As shown in FIGS. 3 and 6, the bearing member 62 has the bearing part 82 provided separately from the screw insertion part 91 for rotatably supporting the developing-roller shaft A1.

Accordingly, this construction can position the bearing member 62 with reference to the developing-roller shaft A1.

By positioning the developing electrode 63 relative to the bearing member 62, the bearing member 62 can ensure good precision in positioning the developing electrode 63 relative to the developing roller 34.

Thus, this construction can ensure that electricity is conducted between the developing-roller shaft A1 and the developing electrode 63.

(11) As shown in FIGS. 6 and 7, the inner diameter of the screw insertion part 91 is larger than the inner diameter of the threaded part 51.

Accordingly, when the screw insertion part 91 and the supply electrode 61 are aligned with each other, the threaded part 51 can easily be seen in a plane orthogonal to the left-right direction.

Thus, the screw 110 can be easily screwed into the threaded part 51 through the screw insertion part 91.

(12) As shown in FIG. 9, the rear end of the second insulating part 85 (the connecting part 88 for connecting the top surface 86 to the rear surface 87) constituting the bearing member 62 can be used to facilitate mounting of the developing cartridge 19 in the drum cartridge 18. In other words, the developing cartridge 19 can be smoothly mounted in the drum cartridge 18 using the bearing member 62, which is formed of a harder material than the developing-side contact part 101 and the supply-side contact part 64.

7. Variations of the Embodiment (1) A variation of the developing cartridge 19 will be described next with reference to FIG. 11. Note that directions related to the developing cartridge 19 will be specified based on the orientation of the developing cartridge 19 when resting on a flat surface, and specifically based on the directions indicated by arrows in FIG. 11.

Figure 11:
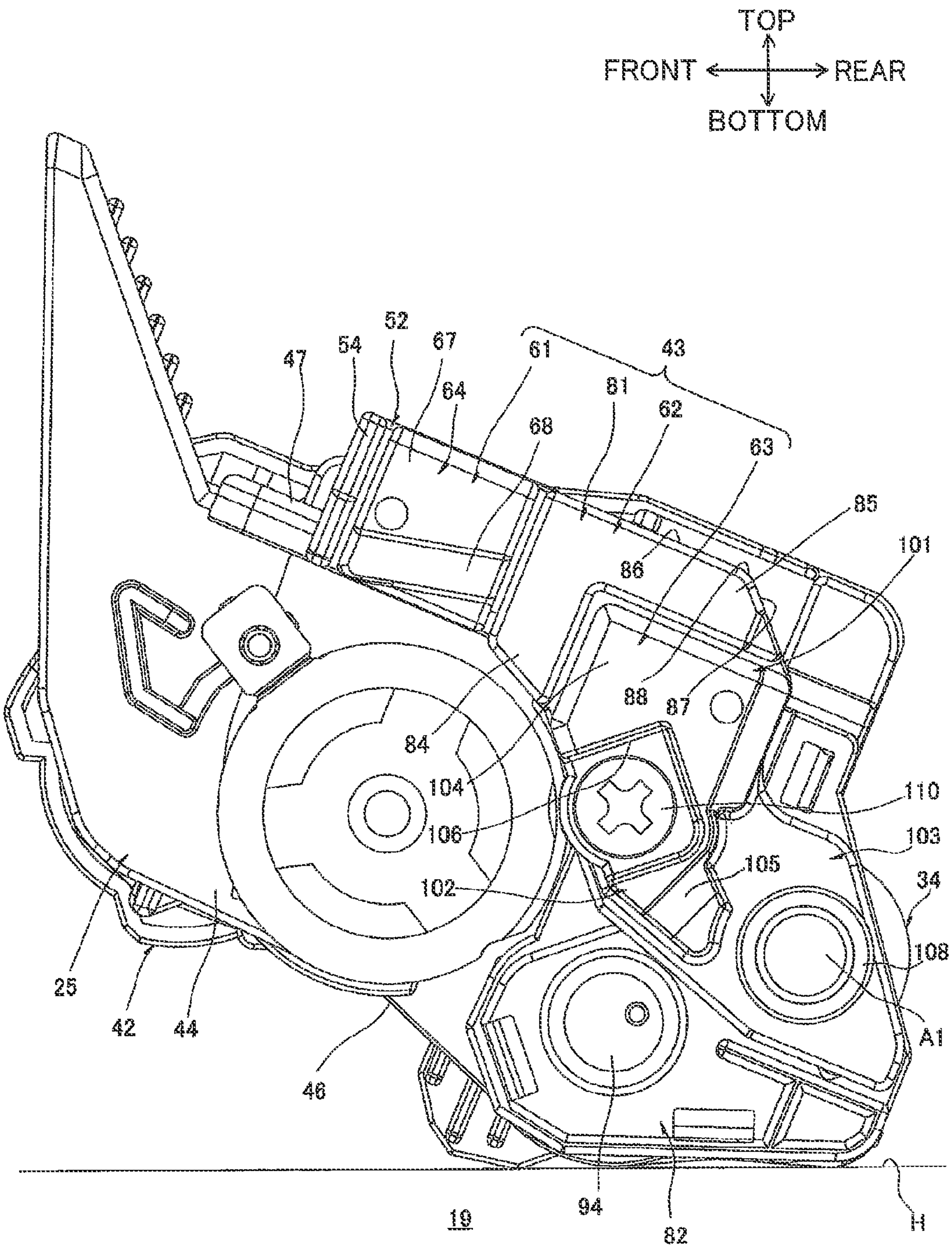
FIG. 11 is a right side view showing a placement of a developing cartridge rested on a level surface according to a modification of the embodiment.

As shown in FIG. 11, the developing cartridge 19 described above can be placed on a horizontal surface H such that the front end of the developing cartridge 19 is separated from the horizontal surface H.

At this time, the rear end of the bottom wall 46 (the portion of the bottom wall 46 disposed rearward of the supply roller 33) is in contact with the horizontal surface H.

To lift the developing cartridge 19, the operator grips the front end of the developing cartridge 19 and lifts the developing cartridge 19 upward.

(2) The printer 1 described above is an example of the image forming device of the present invention, but the present invention is not limited to the embodiments described above.

In addition to the monochrome printer described above, the image-forming device of the present invention may be configured as a color printer.

When configured as a color printer, the image-forming device may be configured as a direct tandem color printer provided with a plurality of photosensitive bodies and a recording medium conveying member; or may be configured as an intermediate transfer tandem color printer provided with a plurality of photosensitive bodies, an intermediate transfer body, and a transfer member.

In addition to the separable process cartridge 15 that allows the drum cartridge 18 and the developing cartridge 19 to be separated from each other, as described above, the process cartridge 15 may be an integrated unit in which the drum cartridge 18 and the developing cartridge 19 are integrally provided.

It is also possible to provide the photosensitive drum 20 in the main casing 2, while enabling only the developing cartridge 19 to be mounted in and removed from the main casing 2.

Further, in place of the photosensitive drum 20 described above, a photosensitive belt or other member may be used as the photosensitive body.

Similarly, instead of the developing roller 34 described above, a developing sleeve, a developing belt, a brush roller, or other device may be used as the developer-carrying body.

Further, instead of the supply roller 33 described above, a supply sleeve, a supply belt, a brush roller, or other member may be used as the supply member.

Further, instead of the agitator 29 described above, an auger screw, a conveying belt, or another member may be used as the conveying member.

Further, instead of the transfer roller 21 described above, a contact-type transfer member such as a transfer belt, a transfer brush, a transfer blade, and a film-like transfer device, or a non-contact-type transfer member such as a corotron-type transfer member may be used as the transfer member.

Further, instead of the scorotron charger 22 described above, a non-contact-type charger such as a corotron-type charger and a charger provided with a sawtooth discharge member, or a contact-type charger such as a charging roller may be used as the charger.

Further, instead of the scanning unit 16 described above, an LED unit or the like may be used as the exposure member.

The image-forming device of the present invention may also be configured as a multifunction peripheral that is equipped with an image-reading unit and the like.

While the developing electrode 63 described above is formed of a conductive resin material, the developing electrode 63 may instead be formed of metal. The supply electrode 61 may be similarly formed of metal.

While the bearing member 62 described above is formed of an insulating resin material, the bearing member 62 may instead be formed of an insulating rubber. Further, while the bearing member 62 described above rotatably supports both the developing-roller shaft A1 and the supply-roller shaft A2, the bearing member 62 may be configured to rotatably support only one of these shafts.

Conductive grease may be added between the supply-roller-shaft insertion part 65 and the supply-roller shaft A2, and between the insertion hole 109 and the developing-roller shaft A1.

What is claimed is:

1. A developing cartridge comprising:
- a housing configured to accommodate developer therein;
- a developing roller rotatable about a first axis extending in a first direction, the developing roller including a developing roller shaft;
- a developing electrode positioned at one side of the housing in the first direction, the developing electrode being formed of conductive resin material, the developing electrode being electrically connected to the developing roller shaft, the developing electrode including:
  - a plate extending in the first direction, the plate being separated from the developing roller shaft in a radial direction of the developing roller; and an insulating part extending in the first direction, the insulating part being formed of insulating resin material, the insulating part surrounding at least a portion of the plate.

2. The developing cartridge according to claim 1, further comprising:

a supply roller rotatable about a second axis extending in the first direction, the supply roller including a supply roller shaft; and a bearing through which the developing roller shaft and the supply roller shaft are inserted, the bearing being positioned at the one side of the housing in the first direction, wherein the bearing includes the insulating part.

3. The developing cartridge according to claim 1, further comprising another electrode, the another electrode being separated from the developing electrode in a second direction.

4. The developing cartridge according to claim 3, wherein at least a portion of the insulating part is positioned between the developing electrode and the another electrode in the second direction.

5. The developing cartridge according to claim 3, wherein the another electrode extends in the first direction and the second direction.

6. The developing cartridge according to claim 5, wherein the plate extends in the second direction.

7. The developing cartridge according to claim 3, further comprising a supply roller rotatable about a second axis extending in the first direction, the supply roller including a supply roller shaft, wherein the another electrode is electrically connected to the supply roller shaft.

8. The developing cartridge according to claim 2, wherein the developing electrode is supported on the bearing.

9. The developing cartridge according to claim 1, wherein the developing electrode contacts one end portion of the developing roller shaft in the first direction.

10. The developing cartridge according to claim 9, wherein a portion of the developing electrode that differs from the plate contacts the one end portion of the developing roller shaft.

11. The developing cartridge according to claim 1, wherein the developing electrode has a contact surface that contacts a device-side developing electrode of an image forming device in a state where the developing cartridge is attached to the image forming device, and wherein the contact surface is exposed from the insulating part.

12. The developing cartridge according to claim 11, wherein the contact surface extends in the radial direction from one end of the plate in the first direction.

13. The developing cartridge according to claim 3, wherein the first direction is orthogonal to the second direction.

* * * * *